(12) United States Patent
Chen et al.

(10) Patent No.: US 9,864,170 B2
(45) Date of Patent: Jan. 9, 2018

(54) MINIATURE IMAGE PICKUP LENS

(71) Applicant: Kinko Optical Co., Ltd., Taichung (TW)

(72) Inventors: Sze-Ying Chen, Taichung (TW); Yi-Fang Chen, Taichung (TW)

(73) Assignee: Kinko Optical Co., Ltd., Taihung (TW)

( * ) Notice: Subject to any disclaimer, the term of this patent is extended or adjusted under 35 U.S.C. 154(b) by 185 days.

(21) Appl. No.: 13/927,762

(22) Filed: Jun. 26, 2013

(65) Prior Publication Data

US 2015/0002942 A1    Jan. 1, 2015

(51) Int. Cl.
*G02B 9/60* (2006.01)
*G02B 3/02* (2006.01)
*G02B 13/00* (2006.01)

(52) U.S. Cl.
CPC .................... *G02B 13/0045* (2013.01)

(58) Field of Classification Search
CPC ..... G02B 13/0045; G02B 3/02; G02B 13/005
USPC .................................. 359/714, 770
See application file for complete search history.

(56) References Cited

U.S. PATENT DOCUMENTS 7,623,305 B2 * 11/2009 Adachi .......................... 359/749
8,576,502 B2 * 11/2013 Chen ...................... G02B 13/18
                                                        359/753

FOREIGN PATENT DOCUMENTS

| CN | 202166776 U | 3/2012 |
| CN | 103123413 A | 5/2013 |
| JP | 2006-337793 A | 12/2006 |

* cited by examiner

*Primary Examiner* — Jack Dinh
(74) *Attorney, Agent, or Firm* — Muncy, Geissler, Olds & Lowe, P.C.

(57) ABSTRACT

A miniature image pickup lens includes a first lens, a second lens, an aperture, a third lens, a fourth lens, and a fifth lens arranged in sequence along an optical axis from an object side to an image side. The first lens is a negative meniscus lens with a convex surface towards the object side and a concave surface towards the image side. The second lens is a positive lens with a convex surface towards the object side. The third lens is a positive biconvex lens, and the fourth lens is a negative biconcave lens. The fifth lens has a convex surface towards the object side.

30 Claims, 27 Drawing Sheets

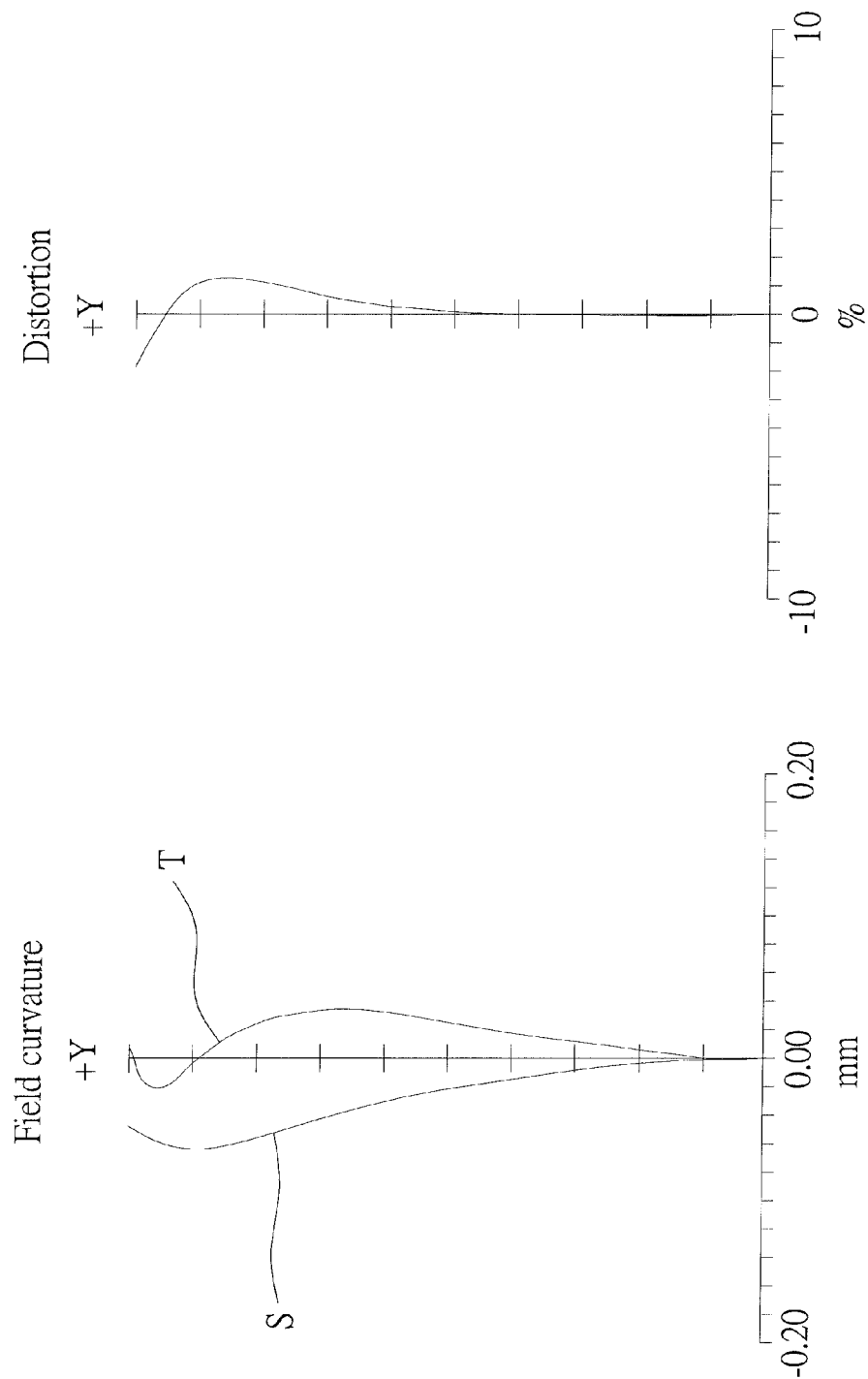

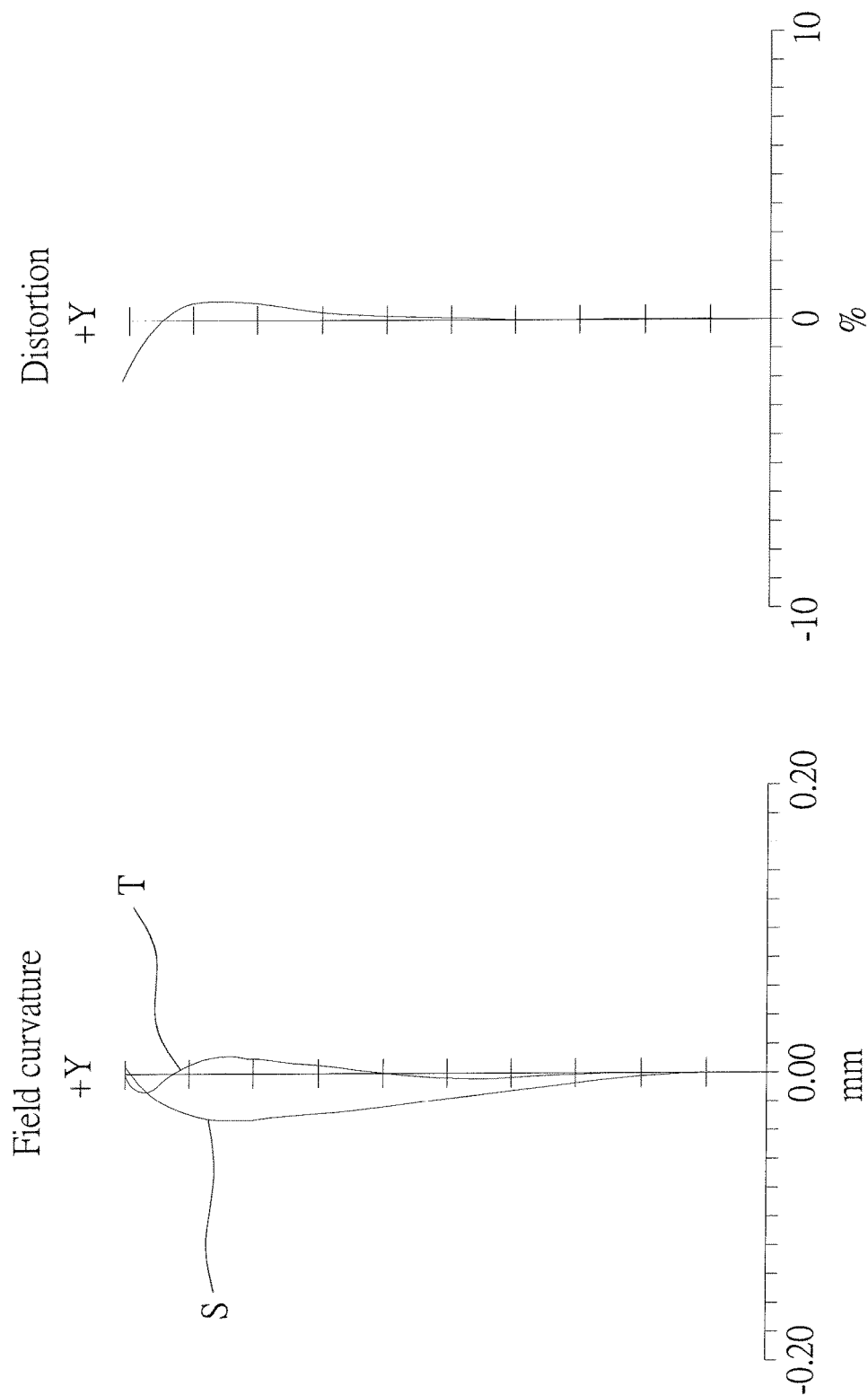

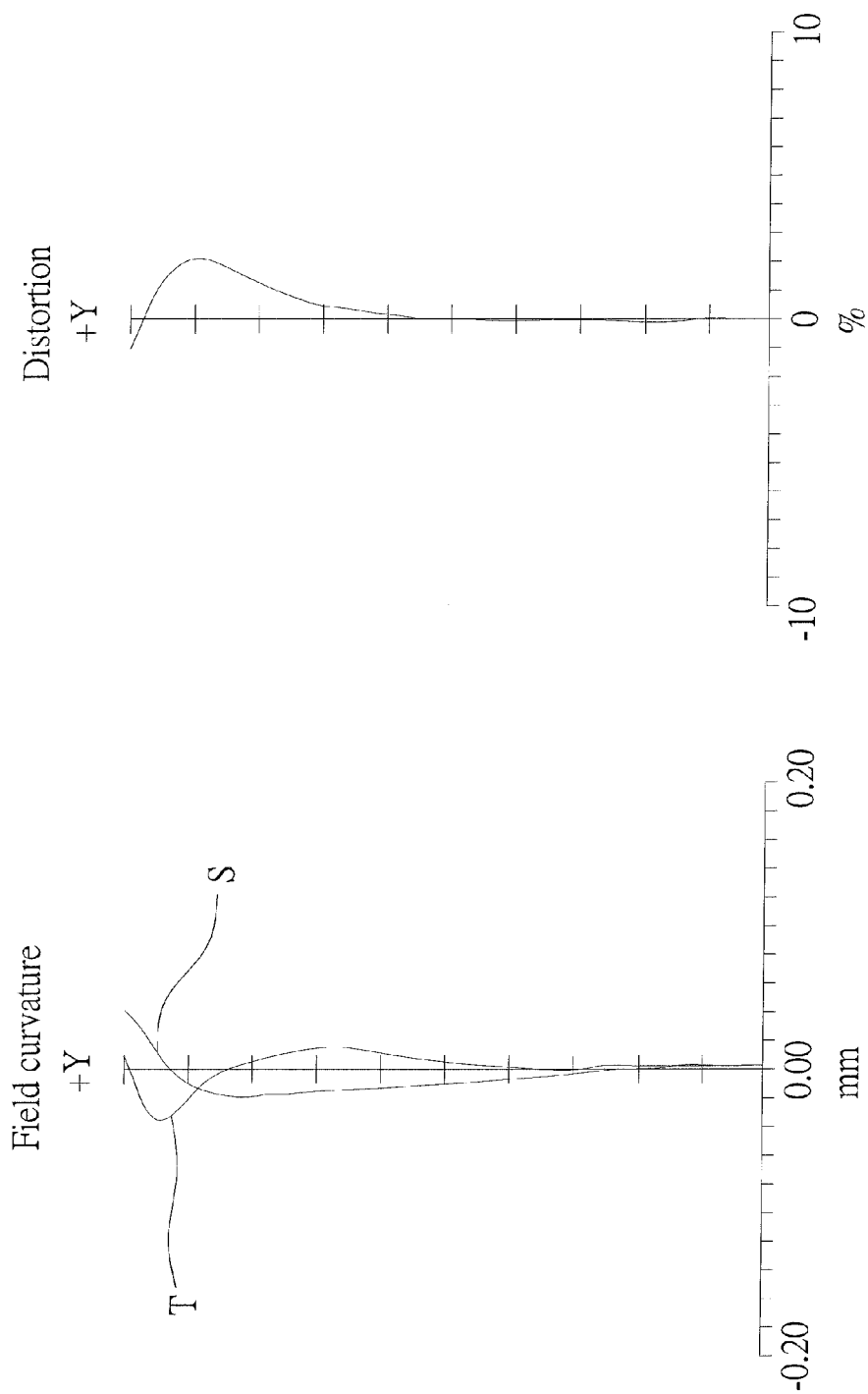

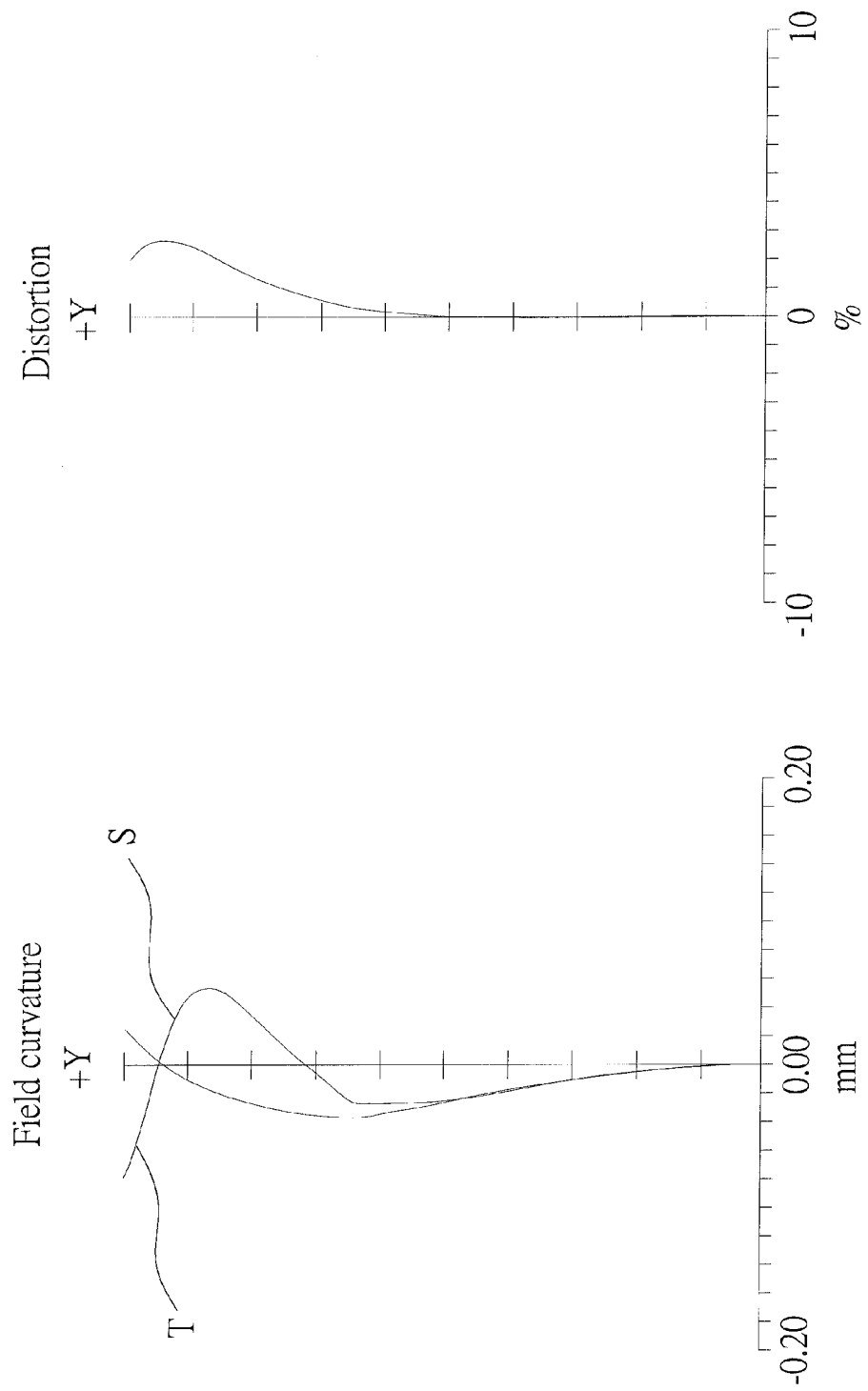

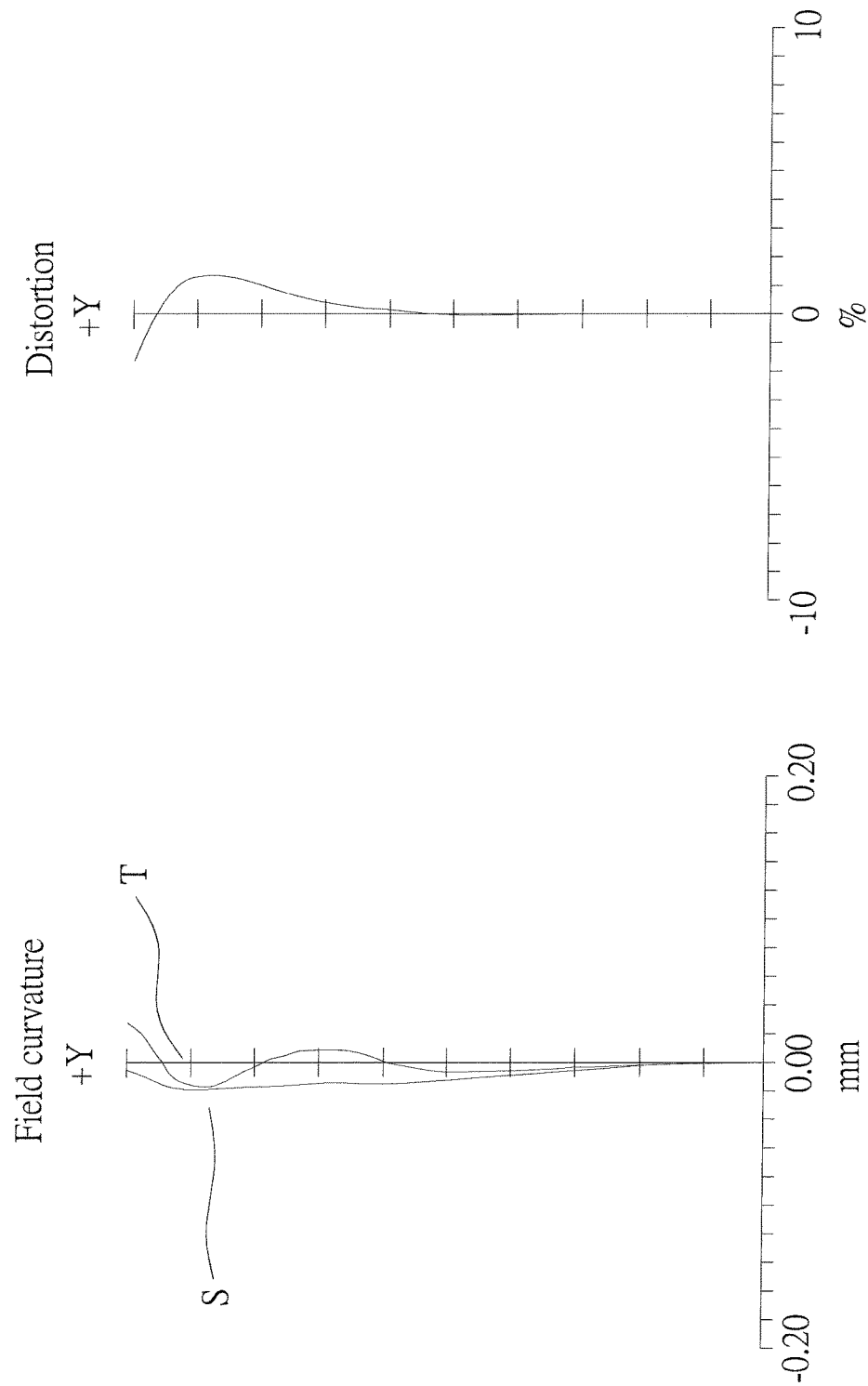

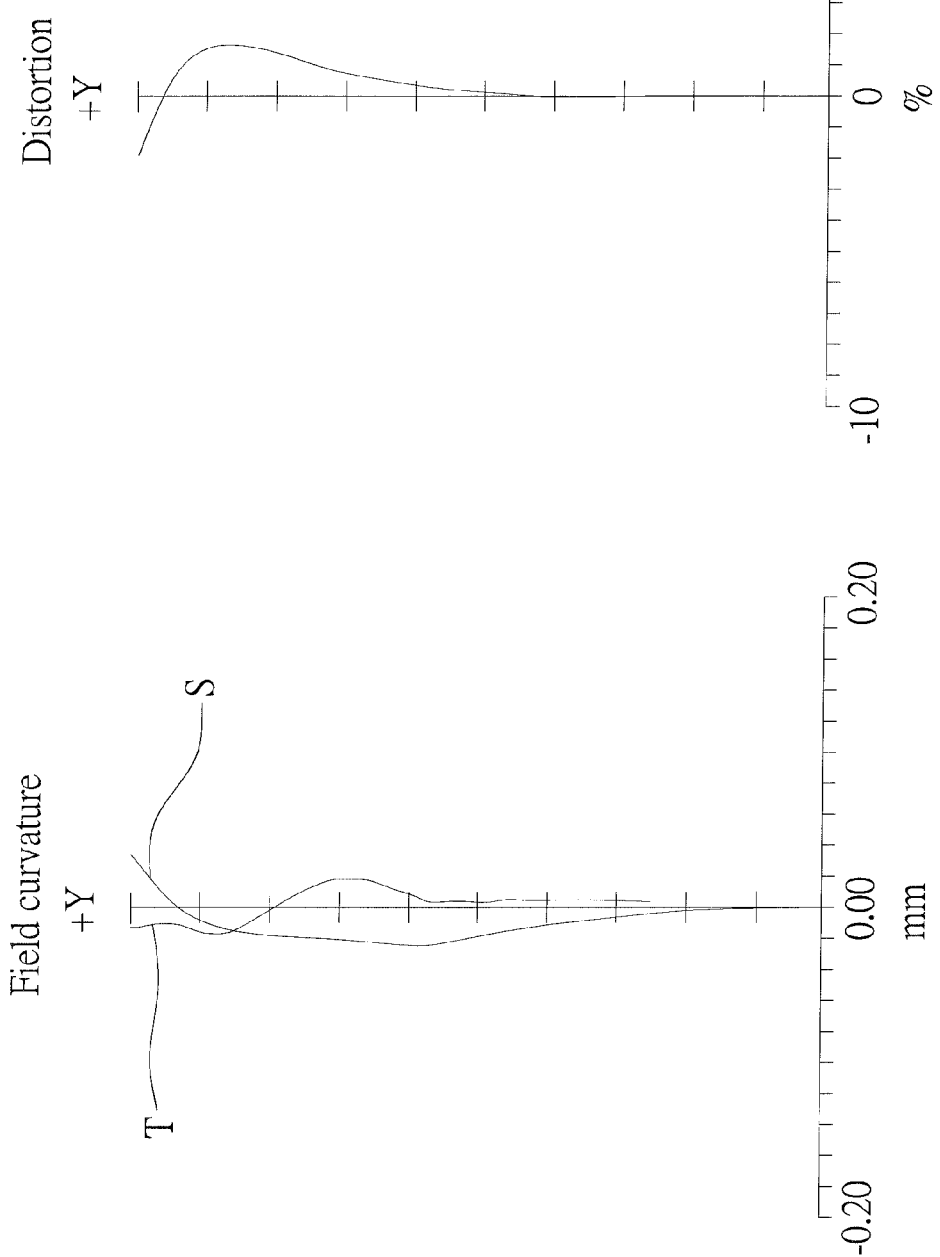

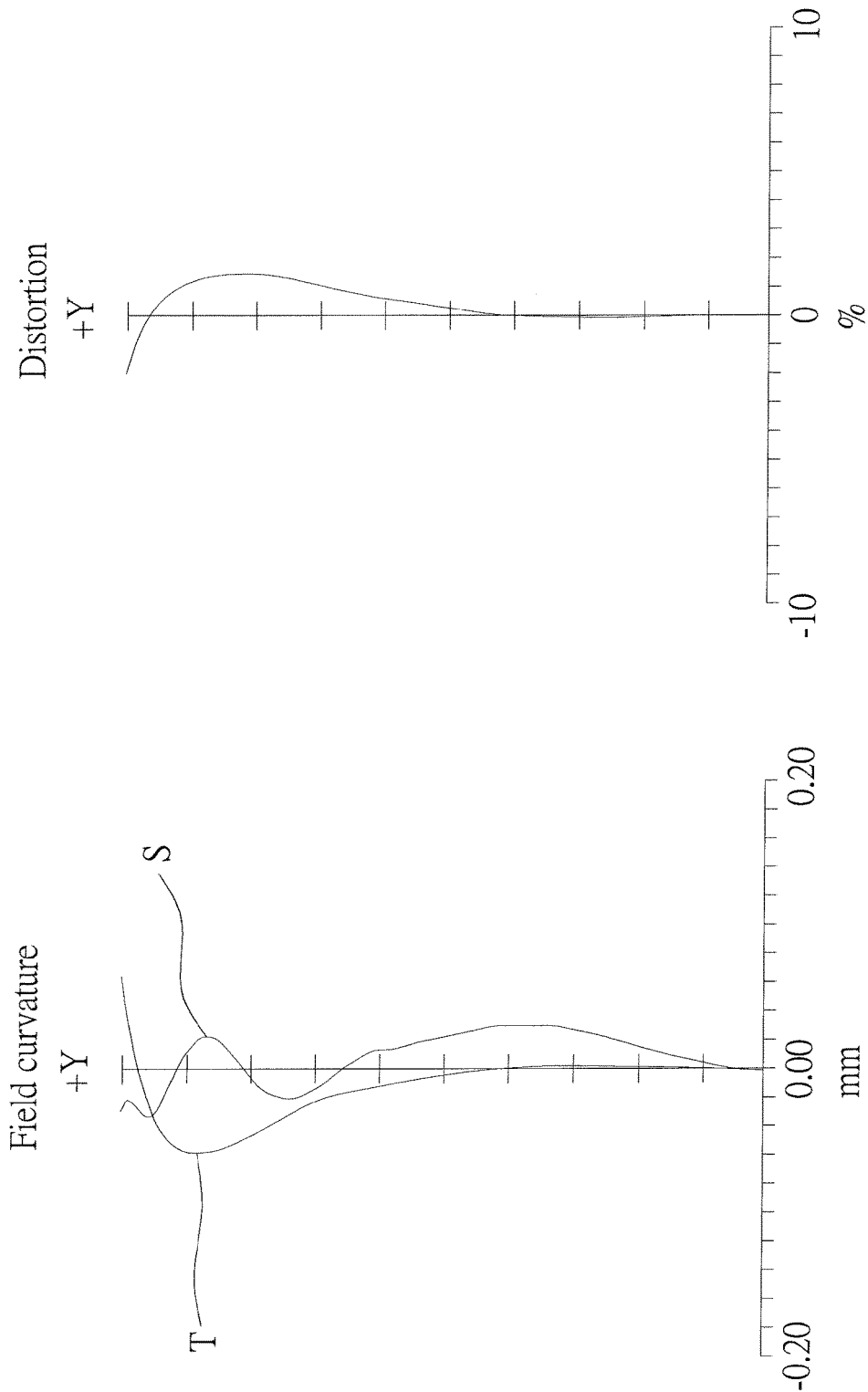

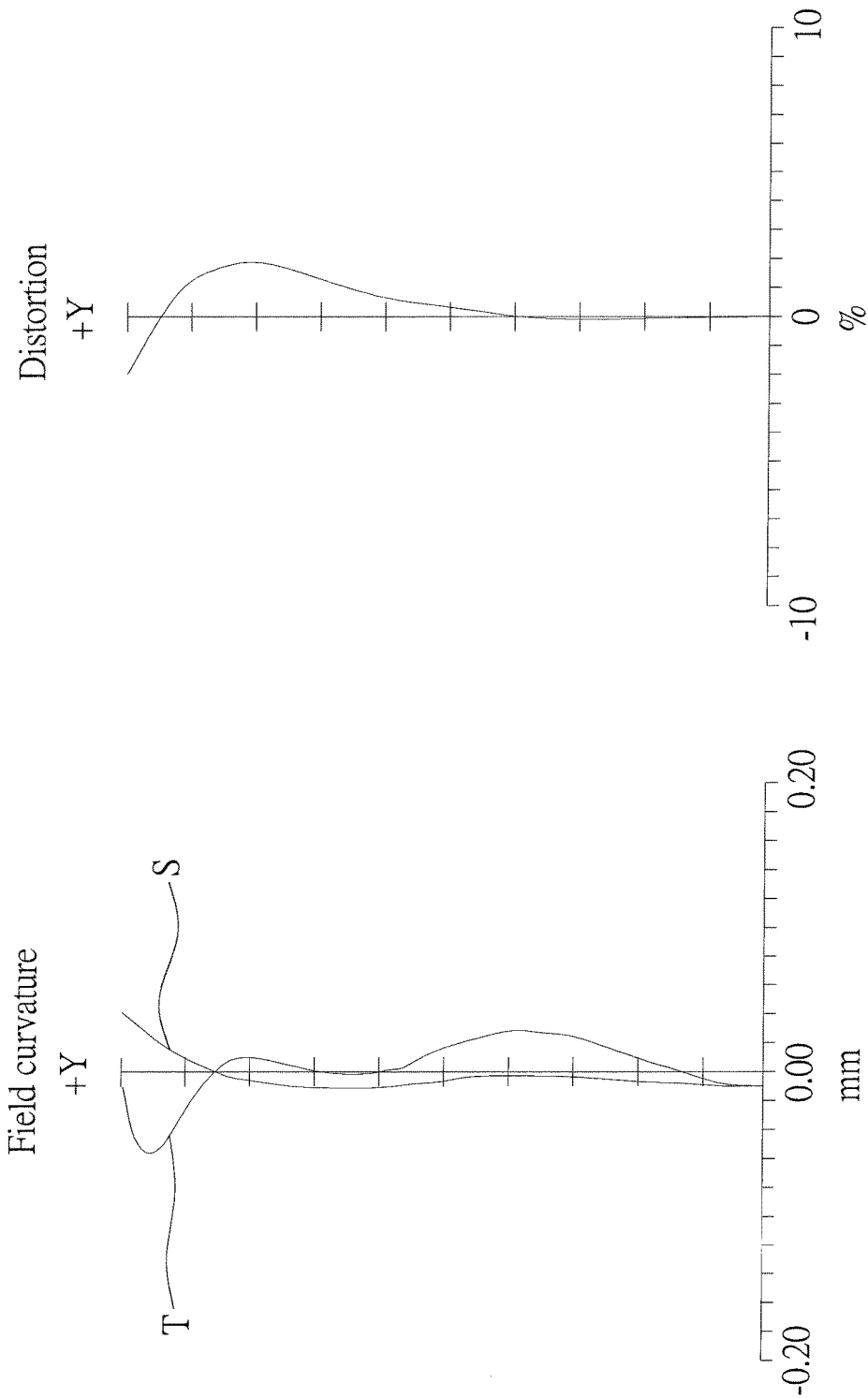

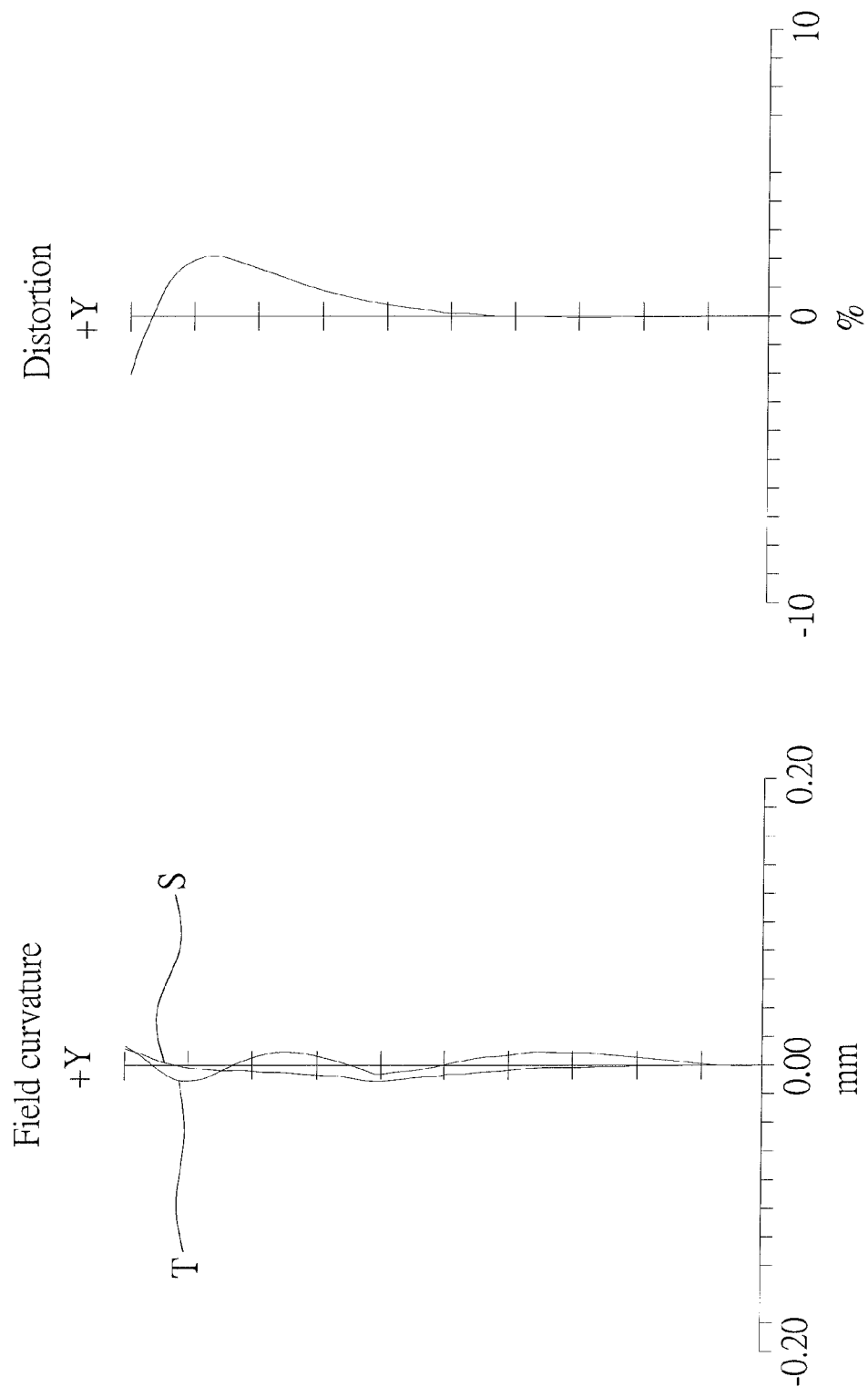

MINIATURE IMAGE PICKUP LENS

BACKGROUND OF THE INVENTION

1. Field of the Invention

The present invention relates generally to an optical lens, and more particularly to a miniature image pickup lens.

2. Description of the Related Art

With the thriving development of portable devices, the market demand for digital image capture modules are continuously growing. In consideration of portability and convenience, it is commonly expected that the digital image capture modules will become smaller and lighter without sacrificing the image quality.

There are two main types of image sensors applied on the conventional image capture modules, which are charge coupled device (CCD) and complementary metal oxide semiconductor (CMOS). CMOS has become the most widely used image sensors in the market of portable devices because of its low cost, low power consumption, and high integration. In addition, due to the advancement in semiconductor manufacturing technology, the size of a pixel has greatly reduced, and therefore an image sensor is able to provide images with higher resolution. But the reduction of pixel size also means that the luminosity captured by an image sensor is less, so some kind of systems of lenses are needed to increase luminosity to reduce the influences of noises.

Along with these image devices becoming smaller, the sizes of aforementioned image capture devices and the lenses applied on the aforementioned image devices are greatly reduced too. The lenses for such image capture modules are requested to have smaller size and higher optical performance as well. As a result, size and optical performance are two indispensable considerations for the lenses of image devices.

Besides, the lenses with small sizes used in image devices are being developed towards wider angles, but such wide-angled systems tend to have problems of distortion and chromatic aberration. Moreover, in consideration of lowering cost, the manufacturers usually use plastic lenses instead of glass ones, but the plastic lenses are more sensitive to temperature, so that the image capture modules with plastic lenses are easily affected by fluctuations of temperature, and have the defect of unstable image quality.

SUMMARY OF THE INVENTION

The primary objective of the present invention is to provide a miniature image pickup lens which is composed by five lenses, and the miniature image pickup lens meets the demand to be smaller and capture higher luminosity. It further ameliorates the problems of distortion and chromatic aberration which are usually happened in wide-angled systems, and it is more insensitive to temperature.

According to the objectives of the present invention, a miniature image pickup lens includes a first lens, a second lens, an aperture, a third lens, a fourth lens, and a fifth lens arranged in sequence along an optical axis from an object side to an image side. The first lens is a negative meniscus lens with a convex surface towards the object side and a concave surface towards the image side. The second lens is a positive lens with a convex surface towards the object side. The third lens is a positive biconvex lens, and the fourth lens is a negative biconcave lens. The fifth lens has a convex surface towards the object side.

Therefore, the miniature image pickup lens of the present invention is Aminiaturized, able to capture wide-angled images, and the captured images have less optical distortion and higher optical performance.

BRIEF DESCRIPTION OF THE DRAWINGS

FIG. 2A shows a field curvature diagram of the first preferred embodiment of the present invention;

FIG. 2B shows a distortion diagram of the first preferred embodiment of the present invention;

FIG. 4A shows a field curvature diagram of the second preferred embodiment of the present invention;

FIG. 4B shows a distortion diagram of the second preferred embodiment of the present invention;

FIG. 6A shows a field curvature diagram of the third preferred embodiment of the present invention;

FIG. 6B shows a distortion diagram of the third preferred embodiment of the present invention;

FIG. 8A shows a field curvature diagram of the fourth preferred embodiment of the present invention;

FIG. 8B shows a distortion diagram of the fourth preferred embodiment of the present invention;

FIG. 10A shows a field curvature diagram of the fifth preferred embodiment of the present invention;

FIG. 10B shows a distortion diagram of the fifth preferred embodiment of the present invention;

FIG. 12A shows a field curvature diagram of the sixth preferred embodiment of the present invention;

FIG. 12B shows a distortion diagram of the sixth preferred embodiment of the present invention;

FIG. 14A shows a field curvature diagram of the seventh preferred embodiment of the present invention;

FIG. 14B shows a distortion diagram of the seventh preferred embodiment of the present invention;

FIG. 16A shows a field curvature diagram of the eighth preferred embodiment of the present invention;

FIG. 16B shows a distortion diagram of the eighth preferred embodiment of the present invention;

FIG. 18A shows a field curvature diagram of the ninth preferred embodiment of the present invention;

FIG. 18B shows a distortion diagram of the ninth preferred embodiment of the present invention.

DETAILED DESCRIPTION OF THE INVENTION

[First Preferred Embodiment]

Figure 1:
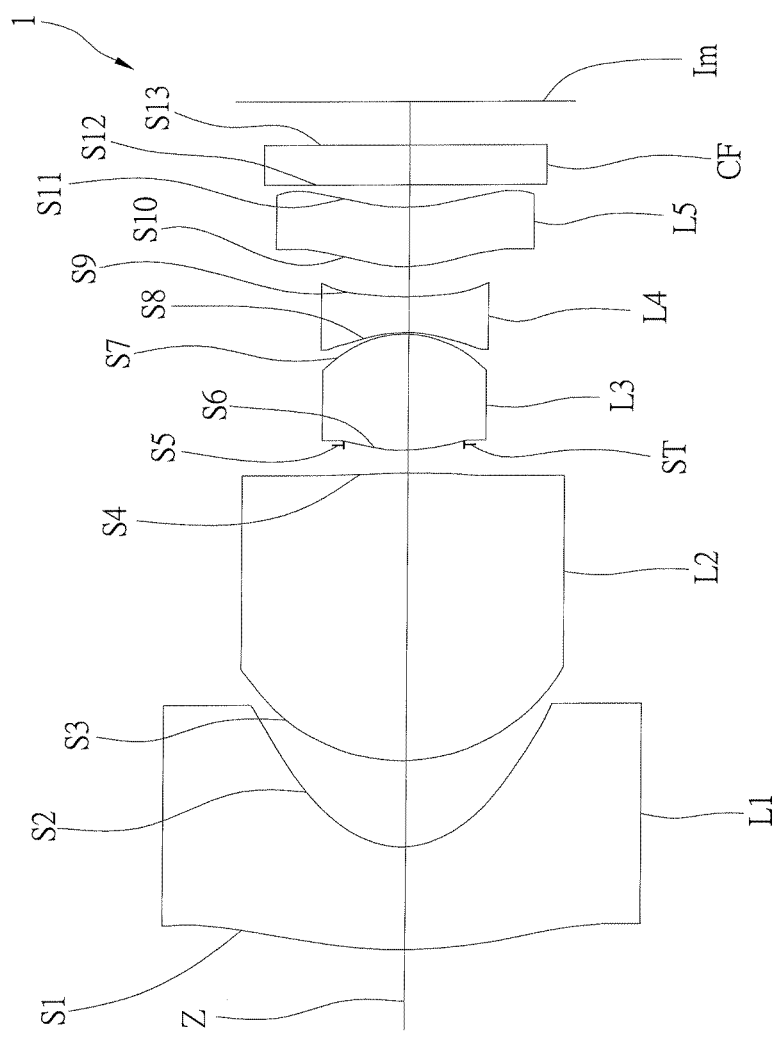
FIG. 1 is a sketch diagram of the arrangement of the lenses of a first preferred embodiment of the present invention.

FIG. 1 shows an arrangement of a miniature image pickup lens 1 of the first preferred embodiment of the present invention, which includes a first lens L1 a second lens L2, an aperture ST, a third lens L3, a fourth lens L4, a fifth lens L5, and an optical filter CF arranged in sequence along an optical axis Z from an object side to an image side Im.

The first lens L1 is a plastic negative meniscus lens with a convex surface S1 towards the object side and a concave surface S2 towards the image side Im, which makes the miniature image pickup lens 1 wide-angled. Both the convex surface S1 and the concave surface S2 of the first lens L1 are aspheric. The reason for applying such aspheric surfaces is to correct the distortion, which happens frequently for the miniature image pickup lens 1 designed as wide-angled.

The second lens L2 is a glass positive biconvex lens with two spherical convex surfaces S3, S4. The second lens L2 is applied to correct the distortion of the miniature image pickup lens 1 as well, and the spherical convex surface S3 of the second lens L2 is helpful to correct the spherical aberration and the field curvature caused by the first lens L1. Furthermore, the glass second lens L2 may reduce the sensitivity to the temperature to make the miniature image pickup lens 1 have a stable optical performance.

The aperture ST is set between the second lens L2 and the third lens L3 to lower the angle incident to the image side Im of the light which enters the miniature image pickup lens 1. Consequently, the lower incident angle effectively increases the luminosity on the image side Im, and therefore the distance between the image side Im and the lenses L1-L5 could be shortened, so that the miniature image pickup lens 1 could be miniaturized. In addition, the aperture ST set between the second lens L2 and the third lens L3 symmetrizes the arrangements of the lenses at the opposite sides of the aperture ST, and therefore lowers the sensitivity while manufacturing the miniature image pickup lens 1.

The third lens L3 is a plastic positive biconvex lens with two aspheric convex surfaces S6 and S7.

The fourth lens L4 is a plastic negative biconcave lens with two aspheric convex surfaces S8 and S9. Due to the positive third lens L3 is in front of the negative fourth lens L4, the miniature image pickup lens 1 could have a shorter length than the one with the negative third lens is in front of the positive fourth lens.

The fifth lens L5 is a plastic positive meniscus lens with a convex surface S10 towards the object side and a concave surface S11 towards the image side Im, and both the convex surface S10 and the concave surface S11 are aspheric. The fifth lens L5 could effectively ameliorate the problems of coma and astigmatism which may happen for the miniature image pickup lens 1, and correct the incident angle of light to the image side Im, and therefore enhance the optical performance of the miniature image pickup lens 1.

The miniature image pickup lens 1 of the present invention further satisfies the following conditions:

$$0.1 < f/TTL < 0.3; \quad\quad\quad 1)$$

$$0.8 < |f_3/f_4| < 1.25; \quad\quad\quad 2)$$

$$vd_3 - vd_4 > 20; \quad\quad\quad 3)$$

where f is a total focal length of the miniature image pickup lens 1;

TTL is a total length of the miniature image pickup lens 1;

$f_3$ is a focal length of the third lens L3;

$f_4$ is a focal length of the fourth lens L4;

$vd_3$ is a dispersion index of the third lens L3; and $vd_4$ is a dispersion index of the fourth lens L4.

Through the condition 1, the miniature image pickup lens 1 could have the advantages of wide-angle and short total length. The conditions 2 and 3 are applied to eliminate the chromatic aberration of the miniature image pickup lens 1 and enhance the image quality by designing the focal lengths and dispersion indexes of the third lens L3 and the fourth lens L4.

In order to achieve the aforementioned purposes and enhance the optical performance of the miniature image pickup lens 1, Table 1 shows the specifications of the miniature image pickup lens 1 of the first preferred embodiment, including the total focal length of the miniature image pickup lens 1 (f), the total length of the miniature image pickup lens 1 (TTL), the radius of each lens along the optical axis Z (R), the distance between two neighboring surfaces or between the lens and the image side Im along the optical axis Z (D), the refractive index of each lens (Nd), the Abbe number (vd) of each lens, and the focal lengths of each lens (f1-f5):

TABLE 1 f = 3.34 mm
TTL = 15.08 mm

| Side | R(mm) | D(mm) | Nd | Vd | |
|---|---|---|---|---|---|
| S1 | 9 | 1.83 | 1.53 | 56 | L1 |
| S2 | 1.7 | 1.54 | | | f1 = −4.15 mm |
| S3 | 3.4 | 5.11 | 1.60 | 65 | L2 |
| S4 | −23 | 0.51 | | | f2 = 5.31 mm |
| S5 | ∞ | −0.09 | | | ST |
| S6 | 3.2 | 2.06 | 1.53 | 56 | L3 |
| S7 | −1.7 | 0.02 | | | f3 = 2.48 mm |
| S8 | −2.4 | 0.64 | 1.64 | 24 | L4 |
| S9 | 10.6 | 0.54 | | | f4 = −2.97 mm |
| S10 | 2.6 | 1.05 | 1.53 | 56 | L5 |
| S11 | 3.1 | 0.39 | | | f5 = 17.5 mm |
| S12 | ∞ | 0.7 | | | CF |
| S13 | ∞ | 0.78 | | | |

In this first preferred embodiment, the sag z of the aspheric surfaces S1, S2, S6, S7, S8, S9, S10, and S11 could be obtained by the following equation:

$$z = \frac{ch^2}{1+\sqrt{1-(1+k)c^2h^2}} + \alpha_2 h^4 + \alpha_3 h^6 + \alpha_4 h^8 + \alpha_5 h^{10} + \alpha_6 h^{12} + \alpha_7 h^{14} + \alpha_8 h^{16}$$

wherein:
z is the sag of the aspheric surface;
c is the curvature of the surface;
h is the semi-diameter of the surface;
k is conic constant;
$\alpha_2$-$\alpha_8$ are coefficients of each order of the semi-diameter h on the surface.

In this first preferred embodiment, the conic constants (k) and the coefficients of each order $\alpha_2$-$\alpha_8$ of each aspheric surface are shown in Table 2.

TABLE 2

|  | k | $\alpha_2$ | $\alpha_3$ | $\alpha_4$ |
|---|---|---|---|---|
| S1 | 0.007880 | −0.001295 | −0.000113 | 0.000009 |
| S2 | −0.808037 | 0.004600 | −0.000861 | 0.000010 |
| S6 | −0.594764 | −0.020462 | 0.010364 | −0.020058 |
| S7 | 0.038856 | 0.047364 | −0.025370 | 0.016348 |
| S8 | −0.282106 | 0.058719 | −0.019184 | 0.002483 |
| S9 | −10.698159 | 0.011268 | 0.017475 | −0.013868 |
| S10 | 0.000646 | −0.064734 | 0.018363 | −0.004747 |
| S11 | 0.077098 | −0.050088 | 0.012405 | −0.002314 |

|  | $\alpha_5$ | $\alpha_6$ | $\alpha_7$ | $\alpha_8$ |
|---|---|---|---|---|
| S1 | 0.000000 | 0.000000 | 0.000000 | 0.000000 |
| S2 | −0.000008 | 0.000001 | 0.000000 | 0.000000 |
| S6 | 0.013208 | −0.004085 | −0.000234 | 0.000000 |
| S7 | −0.003801 | 0.000468 | −0.000026 | 0.000000 |
| S8 | 0.003379 | −0.001193 | 0.000044 | 0.000000 |
| S9 | 0.005973 | −0.000860 | −0.000010 | 0.000000 |
| S10 | 0.000424 | 0.000000 | 0.000000 | 0.000000 |
| S11 | 0.000147 | −0.000001 | 0.000000 | 0.000000 |

Figure 2C:
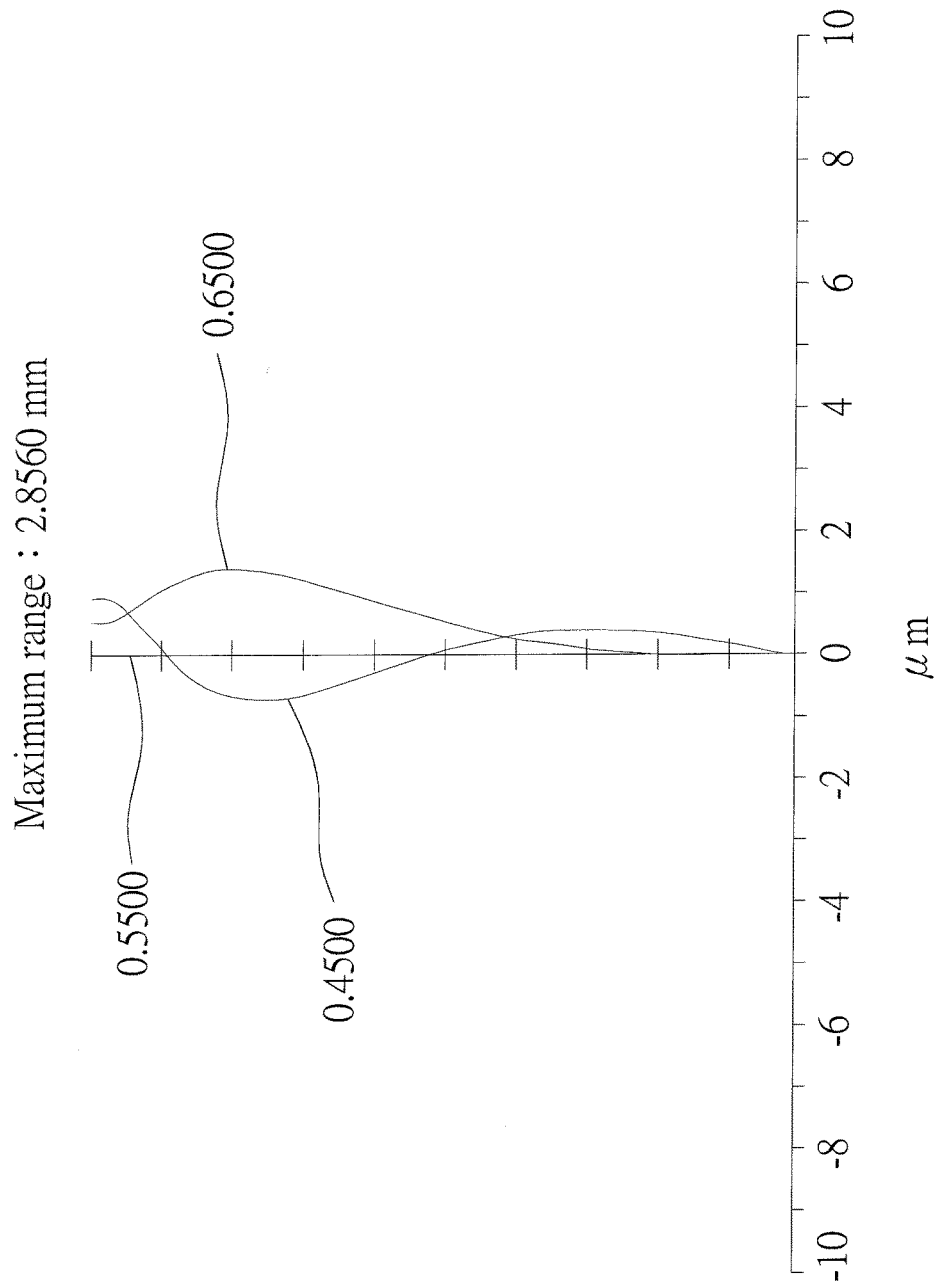
FIG. 2C shows a lateral color aberration diagram of the first preferred embodiment of the present invention.

Through the aforementioned arrangements of the lenses L1-L5 and the apertures ST, the image quality of the miniature image pickup lens 1 could satisfy the demand of the market, which could be realized via FIG. 2A to FIG. 2C. FIG. 2A shows that the maximum field curvature of the miniature image pickup lens 1 no exceeds the range from −0.10 mm to 0.04 mm FIG. 2B shows that the maximum distortion of the miniature image pickup lens 1 is no higher than −2% and 2%. As to FIG. 2C, it shows that the maximum lateral color aberration of the miniature image pickup lens 1 is no larger than 2 μm and −1 μm. The results show that the miniature image pickup lens 1 has an excellent optical performance.

[Second Preferred Embodiment]

Figure 3:
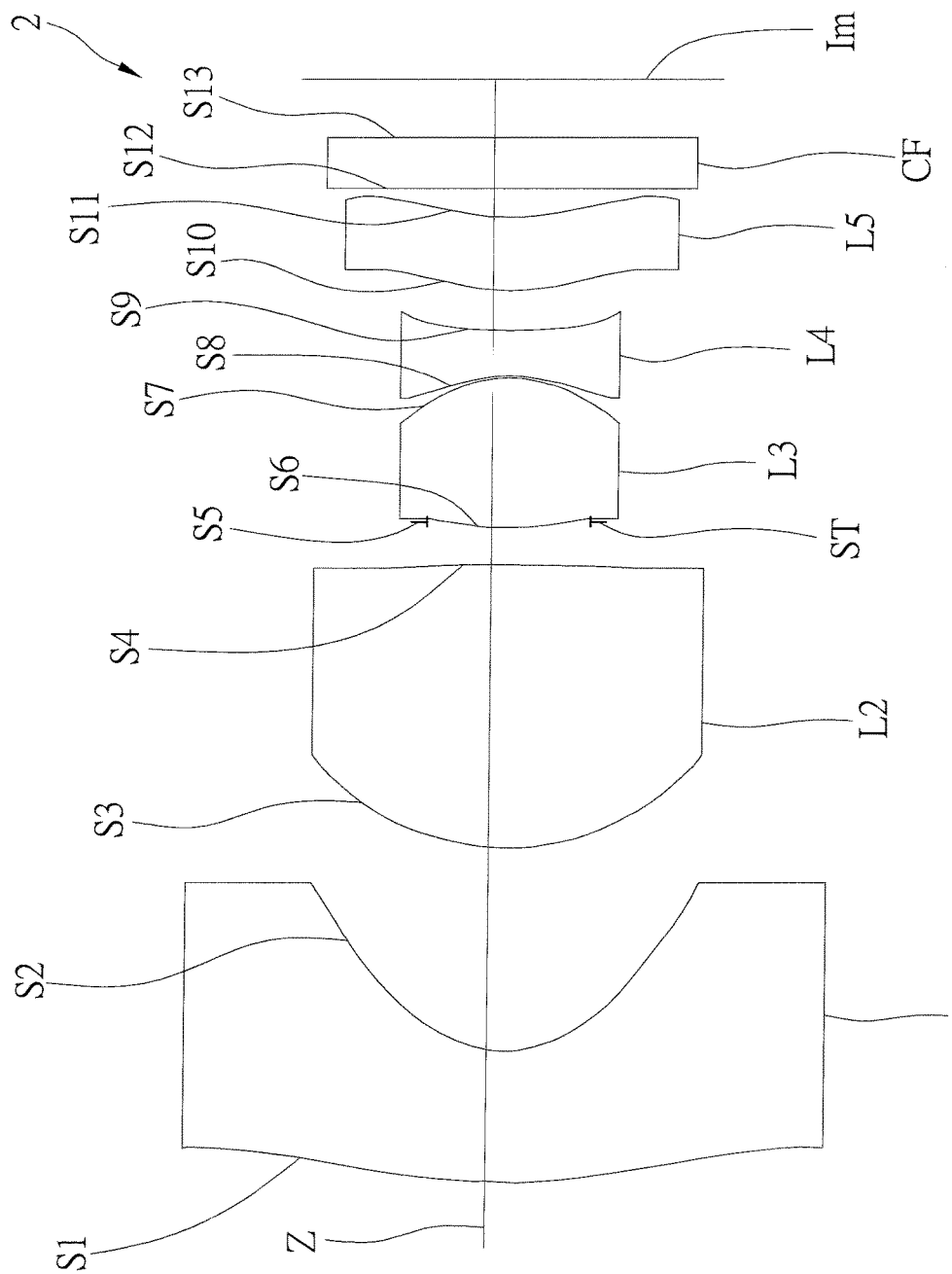
FIG. 3 is a sketch diagram of the arrangement of the lenses of a second preferred embodiment of the present invention.

As shown in FIG. 3, a miniature image pickup lens 2 of the second preferred embodiment of the present invention includes a first lens L1, a second lens L2, an aperture ST, a third lens L3, a fourth lens L4, a fifth lens L5, and an optical filter CF arranged in sequence along an optical axis Z from an object side to an image side Im.

The first lens L1 is a plastic negative meniscus lens with a convex surface S1 towards the object side and a concave surface S2 towards the image side Im, and both the convex surface S1 and the concave surface S2 are aspheric, which makes the miniature image pickup lens 2 wide-angled. The reason for applying such aspheric surfaces is to correct the distortion, which happens easily for the miniature image pickup lens 2 designed as wide-angled.

The second lens L2 is a glass positive biconvex lens with two aspheric convex surfaces S3, S4. The aspheric convex surface S3 of the second lens L2 is helpful to correct the distortion as well, and also the spherical aberration and the field curvature caused by the first lens L1. The sensitivity of the second lens L2 while being manufactured could be lowered too. Furthermore, the glass second lens L2 may reduce the sensitivity to the temperature to make the miniature image pickup lens 2 have a stable optical performance.

The aperture ST is set between the second lens L2 and the third lens L3, and the purpose is the same with the previous embodiment, which is to lower the angle incident to the image side Im of the light enters the miniature image pickup lens 2, and to symmetrizes the arrangements of the lenses at the opposite sides of the aperture ST. As a result, the luminosity on the image side Im could be increased effectively, the distance between the image plane Im and the lenses L1-L5 could be shortened, and the sensitivity of the miniature image pickup lens 2 while being manufactured could be lowered too.

The third lens L3 is a plastic positive biconvex lens with two aspheric convex surfaces S6 and S7.

The fourth lens L4 is a plastic negative biconcave lens with two aspheric concave surfaces S8 and S9. The function of the arrangement of the third lens L3 and the fourth lens L4 is the same as above, the miniature image pickup lens 2 could have a shorter length than the one with the negative third lens is in front of the positive fourth lens.

The fifth lens L5 is a plastic positive meniscus lens with a convex surface S10 towards the object side and a concave surface S11 towards the image side Im, and both the surfaces S10 and S11 are aspheric. The fifth lens L5 could effectively ameliorate the problems of coma and astigmatism which may happen for the miniature image pickup lens 2, and correct the incident angle of light to the image side Im, and therefore enhance the optical performance of the miniature image pickup lens 2.

In addition to the aforementioned structures of the lenses L1-L5, the miniature image pickup lens 2 of the present invention further satisfies the following conditions:

$$0.1 < f/TTL < 0.3; \qquad\qquad 1)$$

$$0.8 < |f/f_3| < 1.25; \qquad\qquad 2)$$

$$vd_3 - vd_4 > 20; \qquad\qquad 3)$$

where
f is a total focal length of the miniature image pickup lens 2;
TTL is a total length of the miniature image pickup lens 2;
$f_3$ is a focal length of the third lens L3;
$f_4$ is a focal length of the fourth lens L4;
$vd_3$ is a dispersion index of the third lens L3; and
$vd_4$ is a dispersion index of the fourth lens L4.

In order to achieve the aforementioned purposes and enhance the optical performance of the miniature image pickup lens 2, Table 3 shows the specifications of the miniature image pickup lens 2 of the second preferred embodiment, including the total focal length of the miniature image pickup lens 2 (f), the total length of the miniature image pickup lens 2 (TTL), the radius of each lens along the optical axis Z (R), the distance between two neighboring surfaces or between the lens and the image side Im along the optical axis Z (D), the refractive index of each lens (Nd), the Abbe number (vd) of each lens; and the focal lengths of each lens (f1-f5):

TABLE 3 f = 3.13 mm
TTL = 15.26 mm

| Side | R(mm) | D(mm) | Nd | Vd | |
|------|-------|-------|------|----|------|
| S1 | 9 | 1.81 | 1.53 | 56 | L1 |
| S2 | 1.7 | 2.81 | | | f1 = −4.18 mm |
| S3 | 3.4 | 3.92 | 1.60 | 68 | L2 |
| S4 | −24.2 | 0.58 | | | f2 = 5.3 mm |
| S5 | ∞ | −0.08 | | | ST |
| S6 | 3.7 | 2.07 | 1.53 | 56 | L3 |
| S7 | −1.8 | 0.02 | | | f3 = 2.6 mm |
| S8 | −2.3 | 0.64 | 1.64 | 24 | L4 |
| S9 | 9.3 | 0.54 | | | f4 = −2.82 mm |
| S10 | 2.6 | 1.01 | 1.53 | 56 | L5 |
| S11 | 3.1 | 0.4 | | | f5 = 18.81 mm |
| S12 | ∞ | 0.7 | | | CF |
| S13 | ∞ | 0.84 | | | |

In this second preferred embodiment, the conic constants (k) and the coefficients of each order $\alpha_2$-$\alpha_8$ of each aspheric surface are shown in Table 4.

TABLE 4

| | k | $\alpha_2$ | $\alpha_3$ | $\alpha_4$ |
|---|---|---|---|---|
| S1 | 0.209644 | −0.001289 | −0.000113 | 0.000009 |
| S2 | −0.809778 | 0.004553 | −0.000880 | 0.000009 |
| S3 | 0.013515 | −0.000003 | 0.000001 | 0.000000 |
| S4 | −3.353595 | 0.000082 | 0.000083 | 0.000188 |
| S6 | −0.556548 | −0.022941 | 0.011981 | −0.022600 |
| S7 | 0.038497 | 0.046011 | −0.024746 | 0.015790 |
| S8 | −0.209281 | 0.059405 | −0.019452 | 0.002080 |
| S9 | −8.050223 | 0.011453 | 0.017636 | −0.013766 |
| S10 | −0.004306 | −0.064814 | 0.018459 | −0.004750 |
| S11 | 0.081672 | −0.050072 | 0.012362 | −0.002318 |

| | $\alpha_5$ | $\alpha_6$ | $\alpha_7$ | $\alpha_8$ |
|---|---|---|---|---|
| S1 | 0.000000 | 0.000000 | 0.000000 | 0.000000 |
| S2 | −0.000009 | 0.000001 | 0.000000 | 0.000000 |
| S3 | 0.000000 | 0.000000 | 0.000000 | 0.000000 |
| S4 | 0.000034 | 0.000002 | −0.000008 | 0.000000 |
| S6 | 0.014896 | −0.004332 | −0.000109 | 0.000000 |
| S7 | −0.004433 | 0.000731 | 0.000028 | 0.000000 |
| S8 | 0.003577 | −0.000902 | 0.000044 | 0.000000 |
| S9 | 0.006079 | −0.000830 | −0.000007 | 0.000000 |
| S10 | 0.000421 | −0.000001 | 0.000000 | 0.000000 |
| S11 | 0.000146 | −0.000001 | 0.000000 | 0.000000 |

Figure 4C:
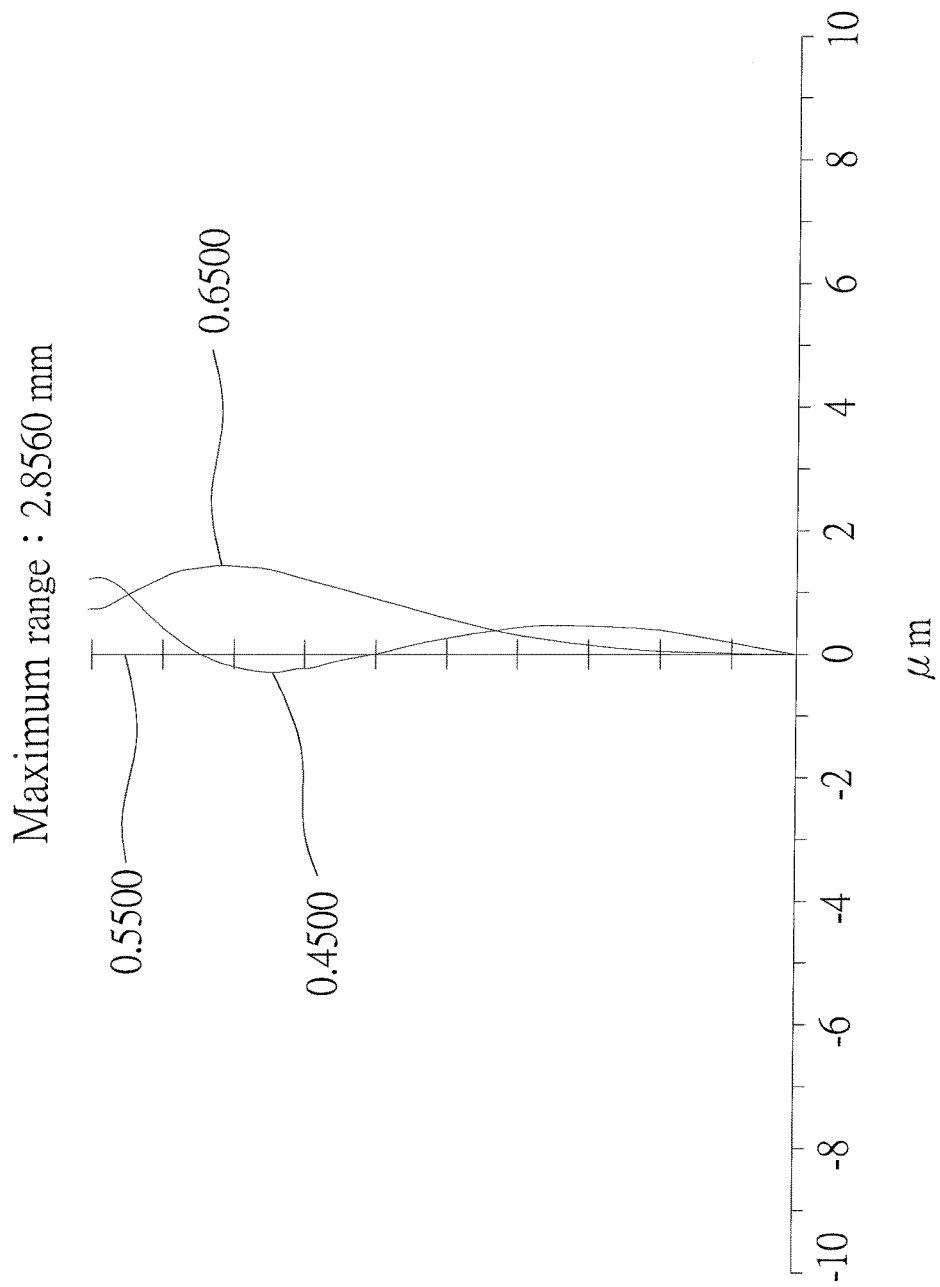
FIG. 4C shows a lateral color aberration diagram of the second preferred embodiment of the present invention.

Through the aforementioned arrangements of the lenses L1-L5 and the apertures ST, the image quality of the miniature image pickup lens 2 could satisfy the demand of the market, which could be realized via FIG. 4A to FIG. 4C. FIG. 4A shows that the maximum field curvature of the miniature image pickup lens 2 no exceeds the range from −0.04 mm to 0.02 mm. FIG. 4B shows that the maximum distortion of the miniature image pickup lens 2 is no higher than −3% and 1%. As to FIG. 4C, it shows that the maximum lateral color aberration of the miniature image pickup lens 2 is no larger than −1 μm and 2 μm. The results show that the miniature image pickup lens 2 has an excellent optical performance.

[Third Preferred Embodiment]

Figure 5:
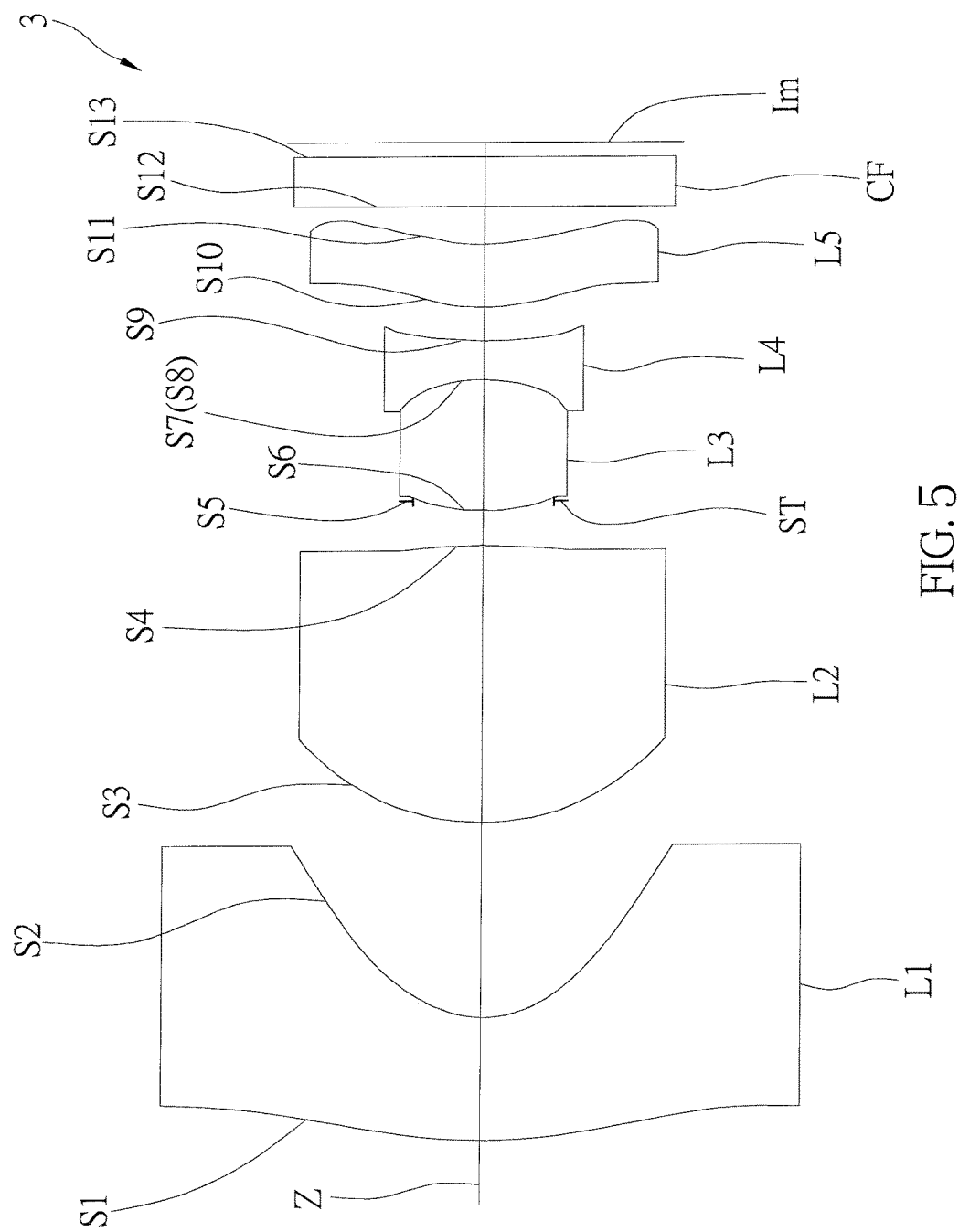
FIG. 5 is a sketch diagram of the arrangement of the lenses of a third preferred embodiment of the present invention.

As shown in FIG. 5, a miniature image pickup lens 3 of the third preferred embodiment of the present invention includes a first lens L1, a second lens L2, an aperture ST, a third lens L3, a fourth lens L4, a fifth lens L5, and an optical filter CF arranged in sequence along an optical axis Z from an object side to an image side Im.

The first lens L1 is a plastic negative meniscus lens with a convex surface S1 towards the object side and a concave surface S2 towards the image side Im, and both the convex surface S1 and the concave surface S2 are aspheric, which makes the miniature image pickup lens 3 wide-angled. The reason for applying such aspheric surfaces is to correct the distortion, which happens frequently for the miniature image pickup lens 3 designed as wide-angled.

The second lens L2 is a glass positive biconvex lens with two aspheric convex surfaces S3 and S4. The aspheric convex surface S3 of the second lens L2 is helpful to correct the distortion as well, and also the spherical aberration and the field curvature caused by the first lens L1. The sensitivity of the second lens L2 while being manufactured could be lowered too. Furthermore, the glass second lens L2 may reduce the sensitivity to the temperature to make the miniature image pickup lens 3 have a stable optical performance.

The aperture ST is set between the second lens L2 and the third lens L3, and the purpose is the same with the previous embodiment, which is to lower the angle incident to the image side Im of the light enters the miniature image pickup lens 2, and to symmetrizes the arrangements of the lenses at the opposite sides of the aperture ST. As a result, the luminosity on the image side Im could be increased effectively, the distance between the image plane Im and the lenses L1-L5 could be shortened, and the sensitivity of the miniature image pickup lens 2 while being manufactured could be lowered too.

The third lens L3 is a plastic positive biconvex lens with two aspheric convex surfaces S6 and S7.

The fourth lens L4 is a plastic negative biconcave lens with two aspheric concave surfaces S8 and S9. The concave surface S8 of the fourth lens L4 is jointed to the convex surface S7 of the third lens L3 to form a compound lens. The function of the arrangement of the third lens L3 and the fourth lens L4 is the same as above, the miniature image pickup lens 3 could have a shorter length than the one with the negative third lens is in front of the positive fourth lens.

The fifth lens L5 is a plastic positive meniscus lens with a convex surface S10 towards the object side and a concave surface S11 towards the image side Im, and both the surfaces S10 and S11 are aspheric. The fifth lens L5 could effectively ameliorate the problems of coma and astigmatism which may happen for the miniature image pickup lens 3, and correct the incident angle of light to the image side Im, and therefore enhance the optical performance of the miniature image pickup lens 3.

The miniature image pickup lens 3 of the present invention further satisfies the following conditions, and again, to make the miniature image pickup lens 3 have the advantages of wide-angle and short total length, and to control the main refractive power of the entire optical system, and to effectively eliminate the chromatic aberration of the miniature image pickup lens 3:

$0.1 < f/TTL < 0.3;$  1)

$0.8 < |f_3/f_4| < 1.25;$  2)

$vd_3 - vd_4 > 20;$  3)

where f is a total focal length of the miniature image pickup lens 3;

TTL is a total length of the miniature image pickup lens 3;

$f_3$ is a focal length of the third lens L3;
$f_4$ is a focal length of the fourth lens L4;

$vd_3$ is a dispersion index of the third lens L3; and $vd_4$ is a dispersion index of the fourth lens L4.

In order to achieve the aforementioned purposes and enhance the optical performance of the miniature image pickup lens 3, Table 5 shows the specifications of the miniature image pickup lens 3 of the third preferred embodiment, including the total focal length of the miniature image pickup lens 3 (f), the total length of the miniature image pickup lens 3 (TTL), the radius of each lens along the optical axis Z (R), the distance between two neighboring surfaces or between the lens and the image side Im along the optical axis Z (D), the refractive index of each lens (Nd), the Abbe number (vd) of each lens, and the focal lengths of each lens (f1-f5):

TABLE 5 f = 2.90 mm
TTL = 14.43 mm

| Side | R(mm) | D(mm) | Nd | Vd | |
|---|---|---|---|---|---|
| S1 | 8.9 | 1.79 | 1.53 | 56 | L1 |
| S2 | 1.7 | 2.81 | | | f1 = −4.21 mm |
| S3 | 3.4 | 3.99 | 1.60 | 68 | L2 |
| S4 | −7.8 | 0.64 | | | f2 = 4.6 mm |
| S5 | ∞ | −0.13 | | | ST |
| S6 | 3.2 | 1.89 | 1.53 | 56 | L3 |
| S7 | −2 | 0 | | | f3 = 2.66 mm |
| S8 | −2 | 0.57 | 1.64 | 24 | L4 |
| S9 | 8.5 | 0.48 | | | f4 = −2.5 mm |
| S10 | 2.6 | 0.91 | 1.53 | 56 | L5 |
| S11 | 3 | 0.55 | | | f5 = 20.82 mm |
| S12 | ∞ | 0.7 | | | CF |
| S13 | ∞ | 0.23 | | | |

In this third preferred embodiment, the conic constants (k) and the coefficients of each order $\alpha_2$-$\alpha_8$ of each aspheric surface are shown in Table 6.

TABLE 6

| | k | $\alpha_2$ | $\alpha_3$ | $\alpha_4$ |
|---|---|---|---|---|
| S1 | 0.226233 | −0.001286 | −0.000113 | 0.000009 |
| S2 | −0.808504 | 0.004645 | −0.000880 | 0.000008 |
| S3 | −0.014933 | −0.000058 | −0.000022 | −0.000002 |
| S4 | −176.590052 | 0.001649 | 0.000532 | 0.000240 |
| S6 | 2.043671 | −0.011906 | 0.018514 | −0.018670 |
| S7 | −1.317642 | 0.082570 | −0.022124 | −0.028311 |
| S8 | −1.317642 | 0.082570 | −0.022124 | −0.028311 |
| S9 | −31.984512 | 0.009338 | 0.017242 | −0.013708 |
| S10 | 0.114566 | −0.065243 | 0.019076 | −0.004764 |
| S11 | 0.014762 | −0.050110 | 0.012760 | −0.002273 |

| | $\alpha_5$ | $\alpha_6$ | $\alpha_7$ | $\alpha_8$ |
|---|---|---|---|---|
| S1 | 0.000000 | 0.000000 | 0.000000 | 0.000000 |
| S2 | −0.000010 | 0.000000 | 0.000000 | 0.000000 |
| S3 | 0.000000 | 0.000000 | 0.000000 | 0.000000 |
| S4 | 0.000031 | 0.000017 | −0.000013 | 0.000000 |
| S6 | 0.017209 | −0.003079 | −0.000821 | 0.000000 |
| S7 | −0.015777 | −0.004196 | 0.004156 | 0.000000 |
| S8 | −0.015777 | −0.004196 | 0.004156 | 0.000000 |
| S9 | 0.006084 | −0.000869 | −0.000044 | 0.000000 |
| S10 | 0.000411 | −0.000003 | 0.000000 | 0.000000 |
| S11 | 0.000147 | −0.000001 | 0.000000 | 0.000000 |

Figure 6C:
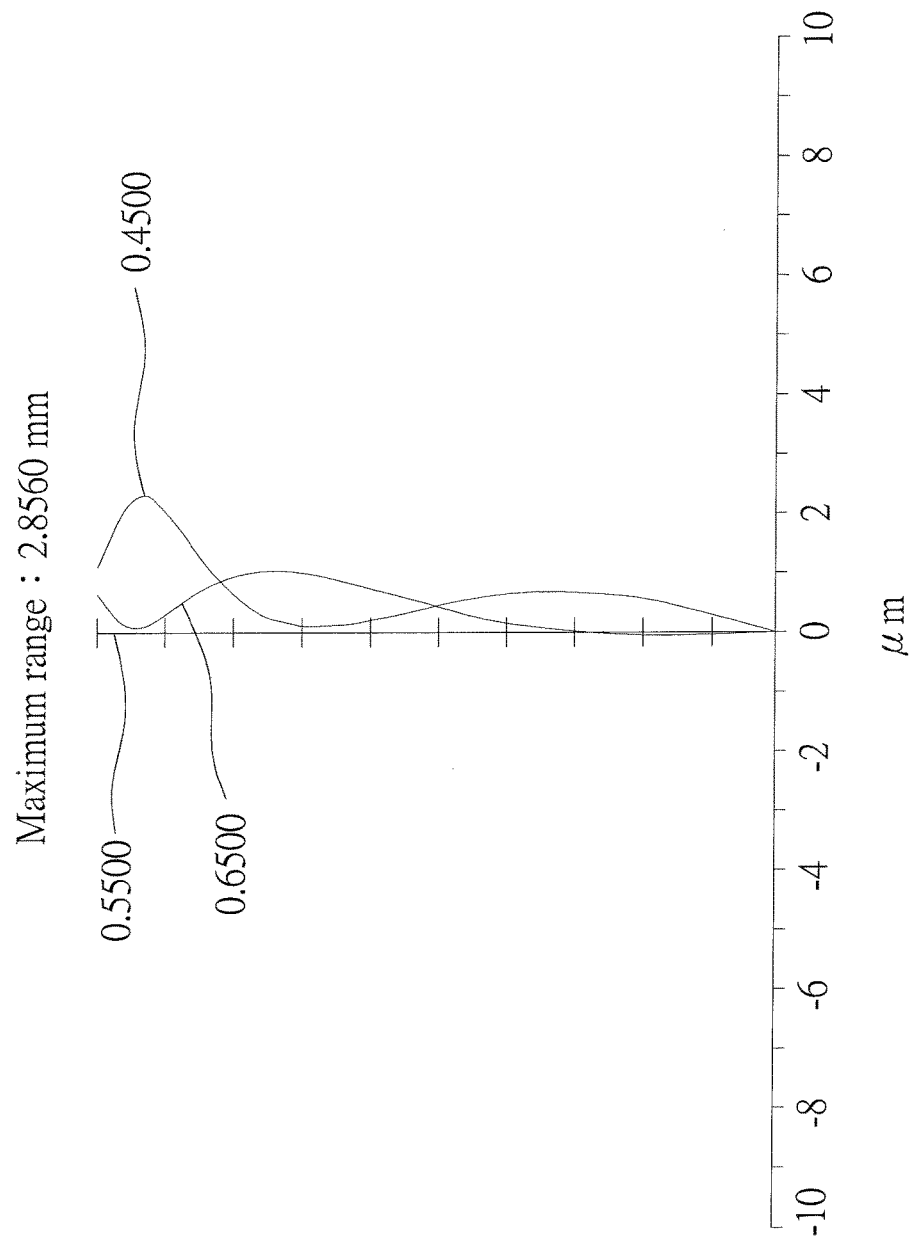
FIG. 6C shows a lateral color aberration diagram of the third preferred embodiment of the present invention.

Through the aforementioned arrangements of the lenses L1-L5 and the apertures ST, the image quality of the miniature image pickup lens 3 could satisfy the demand of the market, which could be realized via FIG. 6A to FIG. 6C. FIG. 6A shows that the maximum field curvature of the miniature image pickup lens 3 no exceeds the range from −0.04 mm to 0.04 mm FIG. 6B shows that the maximum distortion of the miniature image pickup lens 3 is no higher than −1% and 3%. As to FIG. 6C, it shows that the maximum lateral color aberration of the miniature image pickup lens 3 is no higher than −1 μm and 3 μm. The results show that the miniature image pickup lens 3 has an excellent optical performance.

[Fourth Preferred Embodiment]

Figure 7:
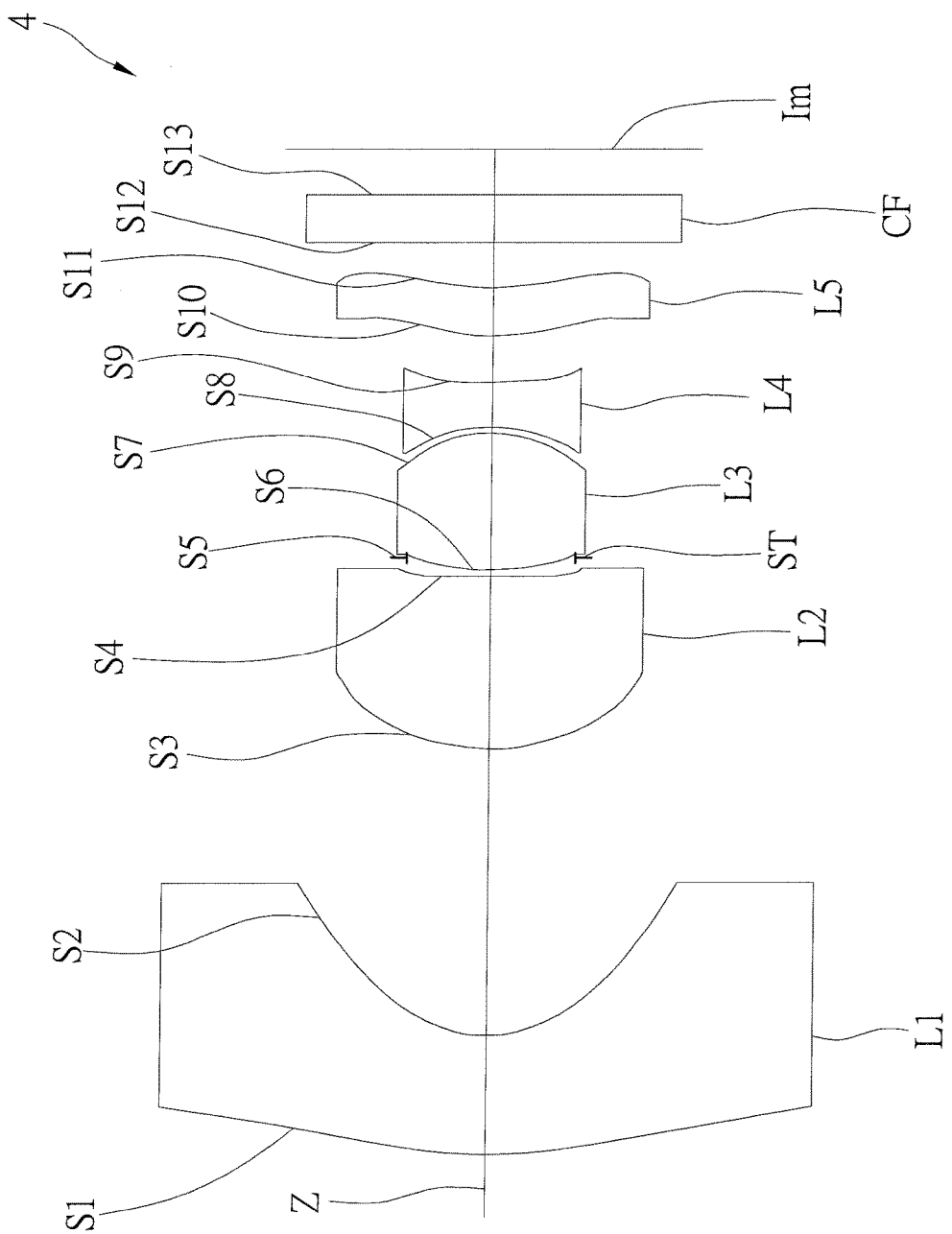
FIG. 7 is a sketch diagram of the arrangement of the lenses of a fourth preferred embodiment of the present invention.

As shown in FIG. 7, a miniature image pickup lens 4 of the fourth preferred embodiment of the present invention includes a first lens L1, a second lens L2, an aperture ST, a third lens L3, a fourth lens L4, a fifth lens L5, and an optical filter CF arranged in sequence along an optical axis Z from an object side to an image side Im.

The first lens L1 is a plastic negative meniscus lens with a convex surface S1 towards the object side and a concave surface S2 towards the image side Im, and both the convex surface S1 and the concave surface S2 are aspheric, which makes the miniature image pickup lens 4 wide-angled. The reason for applying such aspheric surfaces is to correct the distortion, which happens frequently for the miniature image pickup lens 4 designed as wide-angled.

The second lens L2 is a plastic positive biconvex lens with two aspheric convex surfaces S3 and S4. The aspheric convex surface S3 of the second lens L2 is helpful to correct the distortion as well, and also the spherical aberration and the field curvature caused by the first lens L1. The sensitivity of the second lens L2 while being manufactured could be lowered too. In addition, a radius of curvature of an optical axis region of the convex surface S4 of the second lens L2 is positive, and a radius of curvature of the convex surface S4 other than the optical axis region is alternate positive and negative. The optical axis region is a region on the surface of the lens through which the optical axis Z passes. The inflection design of the convex surface S4 of the second lens L2 could effectively reduce coma and astigmatism.

The aperture ST is set between the second lens L2 and the third lens L3, and the purpose is the same with the previous embodiment, which is to lower the angle incident to the image side Im of the light enters the miniature image pickup lens 2, and to symmetrizes the arrangements of the lenses at the opposite sides of the aperture ST. As a result, the luminosity on the image side Im could be increased effectively, the distance between the image plane Im and the lenses L1-L5 could be shortened, and the sensitivity of the miniature image pickup lens 4 while being manufactured could be lowered too.

The third lens L3 is a glass positive biconvex lens with two spherical convex surfaces S6 and S7. The glass third lens L3 may reduce the sensitivity to the temperature to make the miniature image pickup lens 4 have a stable optical performance.

The fourth lens L4 is a plastic negative biconcave lens with two aspheric concave surfaces S8 and S9. The function of the arrangement of the third lens L3 and the fourth lens L4 is the same as above, the miniature image pickup lens 4 could have a shorter length than the one with the negative third lens is in front of the positive fourth lens.

The fifth lens L5 is a plastic positive meniscus lens with a convex surface S10 towards the object side and a concave surface S11 towards the image side Im, and both the surfaces S10 and S11 are aspheric. The fifth lens L5 could effectively ameliorate the problems of coma and astigmatism which may happen for the miniature image pickup lens 4, and correct the incident angle of light to the image side Im, and therefore enhance the optical performance of the miniature image pickup lens 4.

The miniature image pickup lens 4 of the present invention further satisfies the following conditions, and again, to make the miniature image pickup lens 4 have the advantages of wide-angle and short total length, and to control the main refractive power of the entire optical system, and to effectively eliminate the chromatic aberration of the miniature image pickup lens 4:

$$0.1 < f/TTL < 0.3; \quad \quad 1)$$

$$0.8 < |f_3/f_4| < 1.25; \quad \quad 2)$$

$$vd_3 - vd_4 > 20; \quad \quad 3)$$

where f is a total focal length of the miniature image pickup lens 4;

TTL is a total length of the miniature image pickup lens 4;

$f_3$ is a focal length of the third lens L3;

$f_4$ is a focal length of the fourth lens L4;

$vd_3$ is a dispersion index of the third lens L3; and $vd_4$ is a dispersion index of the fourth lens L4.

In order to achieve the aforementioned purposes and enhance the optical performance of the miniature image pickup lens 4, Table 7 shows the specifications of the miniature image pickup lens 4 of the third preferred embodiment, including the total focal length of the miniature image pickup lens 4 (f), the total length of the miniature image pickup lens 4 (TTL), the radius of each lens along the optical axis Z (R), the distance between two neighboring surfaces or between the lens and the image side Im along the optical axis Z (D), the refractive index of each lens (Nd), the Abbe number (vd) of each lens, and the focal lengths of each lens (f1-f5):

TABLE 7

| f = 2.98 mm | | | | |
|---|---|---|---|---|
| TTL = 14.75 mm | | | | |
| Side | R(mm) | D(mm) | Nd | Vd | |
| S1 | 8.2 | 1.75 | 1.53 | 56 | L1 |
| S2 | 1.9 | 4.23 | | | f1 = −4.99 mm |
| S3 | 3.4 | 2.52 | 1.51 | 57 | L2 |
| S4 | −20.3 | 0.27 | | | f2 = 5.8 mm |
| S5 | ∞ | −0.18 | | | ST |
| S6 | 3.5 | 2.02 | 1.52 | 59 | L3 |
| S7 | −1.9 | 0.08 | | | f3 = 2.76 mm |
| S8 | −2.2 | 0.66 | 1.64 | 24 | L4 |
| S9 | 8.1 | 0.68 | | | f4 = −2.65 mm |
| S10 | 2.6 | 0.71 | 1.53 | 56 | L5 |
| S11 | 3.4 | 0.66 | | | f5 = 17.2 mm |
| S12 | ∞ | 0.7 | | | CF |
| S13 | ∞ | 0.65 | | | |

In this third preferred embodiment, the conic constants (k) and the coefficients of each order $\alpha_2$-$\alpha_8$ of each aspheric surface are shown in Table 8.

TABLE 8

| | k | $\alpha_2$ | $\alpha_3$ | $\alpha_4$ |
|---|---|---|---|---|
| S1 | 0.144350 | −0.001273 | −0.000111 | 0.000009 |
| S2 | −0.816800 | 0.004241 | −0.000830 | 0.000013 |
| S3 | 0.148323 | 0.000401 | 0.000510 | 0.000090 |
| S4 | −11149.714160 | 0.012370 | 0.004917 | 0.001927 |
| S8 | 0.676861 | 0.047799 | −0.025603 | −0.002652 |
| S9 | 3.574623 | 0.013907 | 0.017644 | −0.013846 |
| S10 | −0.036167 | −0.066230 | 0.018297 | −0.004697 |
| S11 | 0.403557 | −0.049399 | 0.011997 | −0.002378 |

| | $\alpha_5$ | $\alpha_6$ | $\alpha_7$ | $\alpha_8$ |
|---|---|---|---|---|
| S1 | 0.000000 | 0.000000 | 0.000000 | 0.000000 |
| S2 | −0.000008 | 0.000001 | 0.000000 | 0.000000 |
| S3 | 0.000018 | 0.000003 | 0.000000 | 0.000000 |
| S4 | 0.000844 | 0.000326 | 0.000169 | 0.000000 |
| S8 | 0.002568 | −0.000219 | 0.001373 | 0.000000 |
| S9 | 0.006639 | −0.000357 | 0.000379 | 0.000000 |
| S10 | 0.000432 | 0.000000 | 0.000000 | 0.000000 |
| S11 | 0.000139 | −0.000001 | 0.000000 | 0.000000 |

Figure 8C:
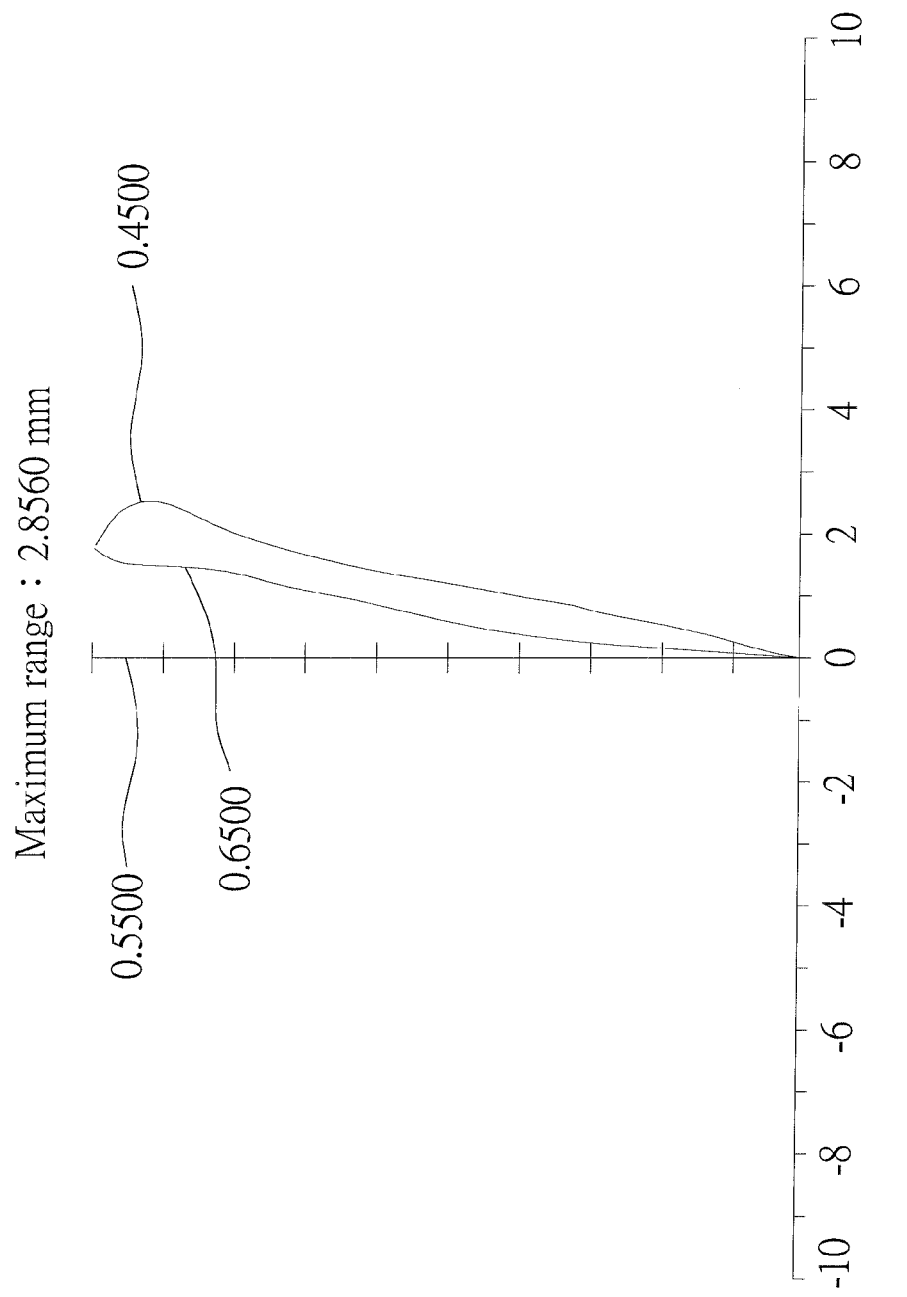
FIG. 8C shows a lateral color aberration diagram of the fourth preferred embodiment of the present invention.

Through the aforementioned arrangements of the lenses L1-L5 and the apertures ST, the image quality of the miniature image pickup lens 4 could satisfy the demand of the market, which could be realized via FIG. 8A to FIG. 8C. FIG. 8A shows that the maximum field curvature of the miniature image pickup lens 4 no exceeds the range from −0.10 mm to 0.06 mm FIG. 8B shows that the maximum distortion of the miniature image pickup lens 4 is no higher than −1% and 3%. As to FIG. 8C, it shows that the maximum lateral color aberration of the miniature image pickup lens 4 is no higher than 3 μm. The results show that the optical performance of the miniature image pickup lens 4 is qualified.

[Fifth Preferred Embodiment]

Figure 9:
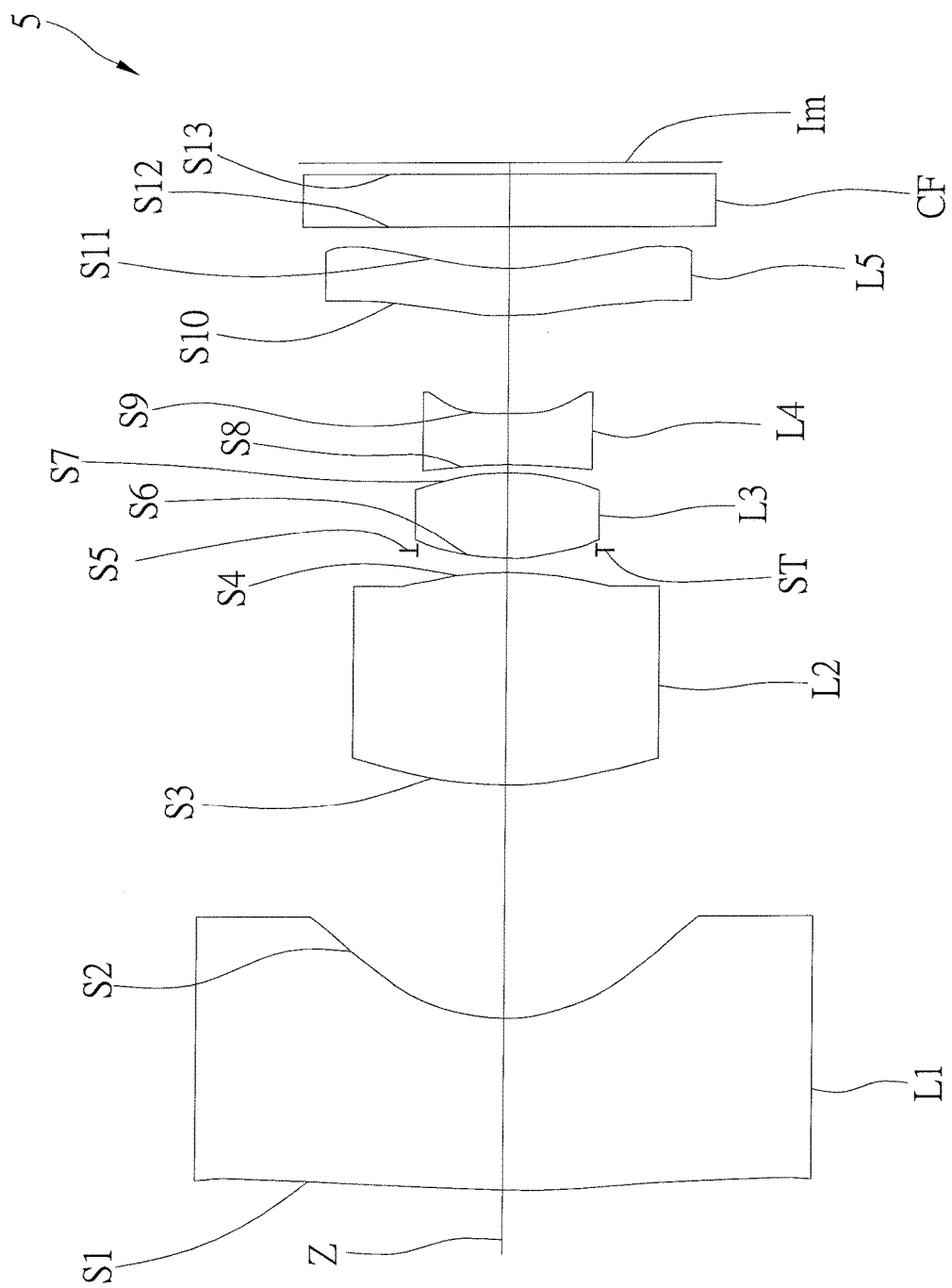
FIG. 9 is a sketch diagram of the arrangement of the lenses of a fifth preferred embodiment of the present invention.

As shown in FIG. 9, a miniature image pickup lens 5 of the fifth preferred embodiment of the present invention includes a first lens L1, a second lens L2, an aperture ST, a third lens L3, a fourth lens L4, a fifth lens L5, and an optical filter CF arranged in sequence along an optical axis Z from an object side to an image side Im.

The first lens L1 is a plastic negative meniscus lens with a convex surface S1 towards the object side and a concave surface S2 towards the image side Im, and both the convex surface S1 and the concave surface S2 are aspheric, which makes the miniature image pickup lens 5 wide-angled. The reason for applying such aspheric surfaces is to correct the distortion, which happens easily for the miniature image pickup lens 5 designed as wide-angled.

The second lens L2 is a plastic positive biconvex lens with two aspheric convex surfaces S3 and S4. The aspheric convex surface S3 of the second lens L2 is helpful to correct the distortion as well, and also the spherical aberration and the field curvature caused by the first lens L1. The sensitivity of the second lens L2 while being manufactured could be lowered too.

The aperture ST is set between the second lens L2 and the third lens L3, and the purpose is the same with the previous embodiment, which is to lower the angle incident to the image side Im of the light enters the miniature image pickup lens 2, and to symmetrizes the arrangements of the lenses at the opposite sides of the aperture ST. As a result, the luminosity on the image side Im could be increased effectively, the distance between the image plane Im and the lenses L1-L5 could be shortened, and the sensitivity of the miniature image pickup lens 5 while being manufactured could be lowered too.

The third lens L3 is a glass positive biconvex lens with two aspheric convex surfaces S6 and S7. The glass third lens L3 may reduce the sensitivity to the temperature to make the miniature image pickup lens 5 have a stable optical performance.

The fourth lens L4 is a plastic negative biconcave lens with two aspheric concave surfaces S8 and S9. The function of the arrangement of the third lens L3 and the fourth lens L4 is the same as above, the miniature image pickup lens 5 could have a shorter length than the one with the negative third lens is in front of the positive fourth lens.

The fifth lens L5 is a plastic negative meniscus lens with a convex surface S10 towards the object side and a concave surface S11 towards the image side Im, and both the surfaces S10 and S11 are aspheric. The fifth lens L5 could effectively ameliorate the problems of coma and astigmatism which may happen for the miniature image pickup lens 5, and correct the incident angle of light to the image side Im, and therefore enhance the optical performance of the miniature image pickup lens 5.

The miniature image pickup lens 5 of the present invention further satisfies the following conditions, and again, to make the miniature image pickup lens 5 have the advantages of wide-angle and short total length, and to control the main refractive power of the entire optical system, and to effectively eliminate the chromatic aberration of the miniature image pickup lens 5:

$$0.1 < f/TTL < 0.3; \quad\quad 1)$$

$$0.8 < |f_3/f_4| < 1.25; \quad\quad 2)$$

$$vd_3 - vd_4 > 20; \quad\quad 3)$$

where f is a total focal length of the miniature image pickup lens 5;

TTL is a total length of the miniature image pickup lens 5;

$f_3$ is a focal length of the third lens L3;
$f_4$ is a focal length of the fourth lens L4;
$vd_3$ is a dispersion index of the third lens L3; and
$vd_4$ is a dispersion index of the fourth lens L4.

In order to achieve the aforementioned purposes and enhance the optical performance of the miniature image pickup lens 5, Table 9 shows the specifications of the miniature image pickup lens 5 of the third preferred embodiment, including the total focal length of the miniature image pickup lens 5 (f), the total length of the miniature image pickup lens 5 (TTL), the radius of each lens along the optical axis Z (R), the distance between two neighboring surfaces or between the lens and the image side Im along the optical axis Z (D), the refractive index of each lens (Nd), the Abbe number (vd) of each lens, and the focal lengths of each lens (f1-f5):

TABLE 9 f = 3.16 mm
TTL = 13.94 mm

| Side | R(mm) | D(mm) | Nd | Vd | |
|------|-------|-------|------|----|---|
| S1 | 22 | 2.32 | 1.53 | 56 | L1 |
| S2 | 2.5 | 3.17 | | | f1 = 5.46 mm |
| S3 | 4.6 | 2.88 | 1.53 | 56 | L2 |
| S4 | −4.8 | 0.29 | | | f2 = 4.93 mm |
| S5 | ∞ | −0.1 | | | ST |
| S6 | 3.4 | 1.16 | 1.58 | 59 | L3 |
| S7 | −3.1 | 0.12 | | | f3 = 2.99 mm |
| S8 | −3.7 | 0.68 | 1.64 | 24 | L4 |
| S9 | 3.8 | 1.34 | | | f4 = −2.83 mm |
| S10 | 3.8 | 0.64 | 1.53 | 56 | L5 |
| S11 | 3.4 | 0.57 | | | f5 = −128.27 mm |
| S12 | ∞ | 0.7 | | | CF |
| S13 | ∞ | 0.18 | | | |

In this third preferred embodiment, the conic constants (k) and the coefficients of each order $\alpha_2$-$\alpha_8$ of each aspheric surface are shown in Table 10.

TABLE 10

| | k | $\alpha_2$ | $\alpha_3$ | $\alpha_4$ |
|---|---|---|---|---|
| S1 | −11.549370 | −0.000635 | −0.000042 | 0.000004 |
| S2 | −0.914915 | 0.002586 | −0.000403 | 0.000000 |
| S3 | −0.234875 | −0.005799 | −0.000330 | −0.000052 |
| S4 | 0.271802 | −0.001848 | 0.007282 | −0.003005 |
| S6 | 1.220466 | −0.006278 | 0.012420 | −0.005950 |
| S7 | −0.325348 | 0.009181 | 0.012595 | −0.008780 |
| S8 | −14.638807 | 0.068185 | −0.008712 | −0.014900 |
| S9 | 3.752232 | 0.072668 | 0.032266 | −0.002144 |
| S10 | −0.302246 | −0.041812 | 0.008829 | −0.001543 |
| S11 | 0.185754 | −0.034891 | 0.005479 | −0.000795 |

| | $\alpha_5$ | $\alpha_6$ | $\alpha_7$ | $\alpha_8$ |
|---|---|---|---|---|
| S1 | 0.000000 | 0.000000 | 0.000000 | 0.000000 |
| S2 | −0.000002 | 0.000000 | 0.000000 | 0.000000 |
| S3 | 0.000013 | 0.000001 | 0.000000 | 0.000000 |
| S4 | 0.000757 | 0.000040 | 0.000021 | 0.000000 |
| S6 | 0.000742 | −0.000308 | −0.000272 | 0.000000 |
| S7 | 0.002908 | −0.000457 | −0.000735 | 0.000000 |
| S8 | 0.003611 | −0.000576 | −0.000262 | 0.000000 |
| S9 | −0.005712 | −0.004497 | −0.001089 | 0.000000 |
| S10 | 0.000126 | 0.000001 | 0.000000 | 0.000000 |
| S11 | 0.000041 | 0.000000 | 0.000000 | 0.000000 |

Figure 10C:
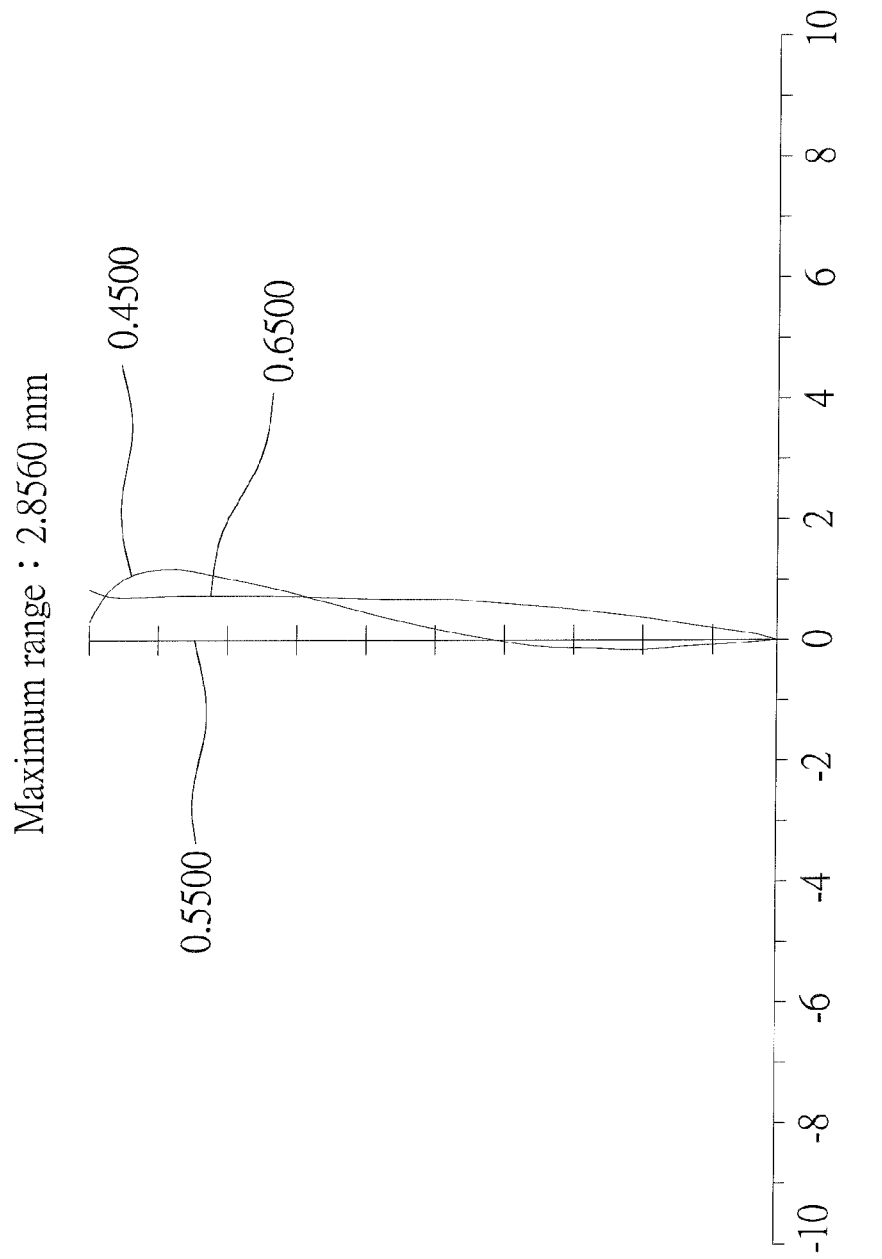
FIG. 10C shows a lateral color aberration diagram of the fifth preferred embodiment of the present invention.

Through the aforementioned arrangements of the lenses L1-L5 and the apertures ST, the image quality of the miniature image pickup lens 5 could satisfy the demand of the market, which could be realized via FIG. 10A to FIG. 10C. FIG. 10A shows that the maximum field curvature of the miniature image pickup lens 5 no exceeds the range from −0.02 mm to 0.04 mm FIG. 10B shows that the maximum distortion of the miniature image pickup lens 5 is no higher than −2% and 2%. As to FIG. 10C, it shows that the maximum lateral color aberration of the miniature image pickup lens 5 is no higher than −1 μm and 2 μm. The results show that the miniature image pickup lens 5 has an excellent optical performance.

[Sixth Preferred Embodiment]

Figure 11:
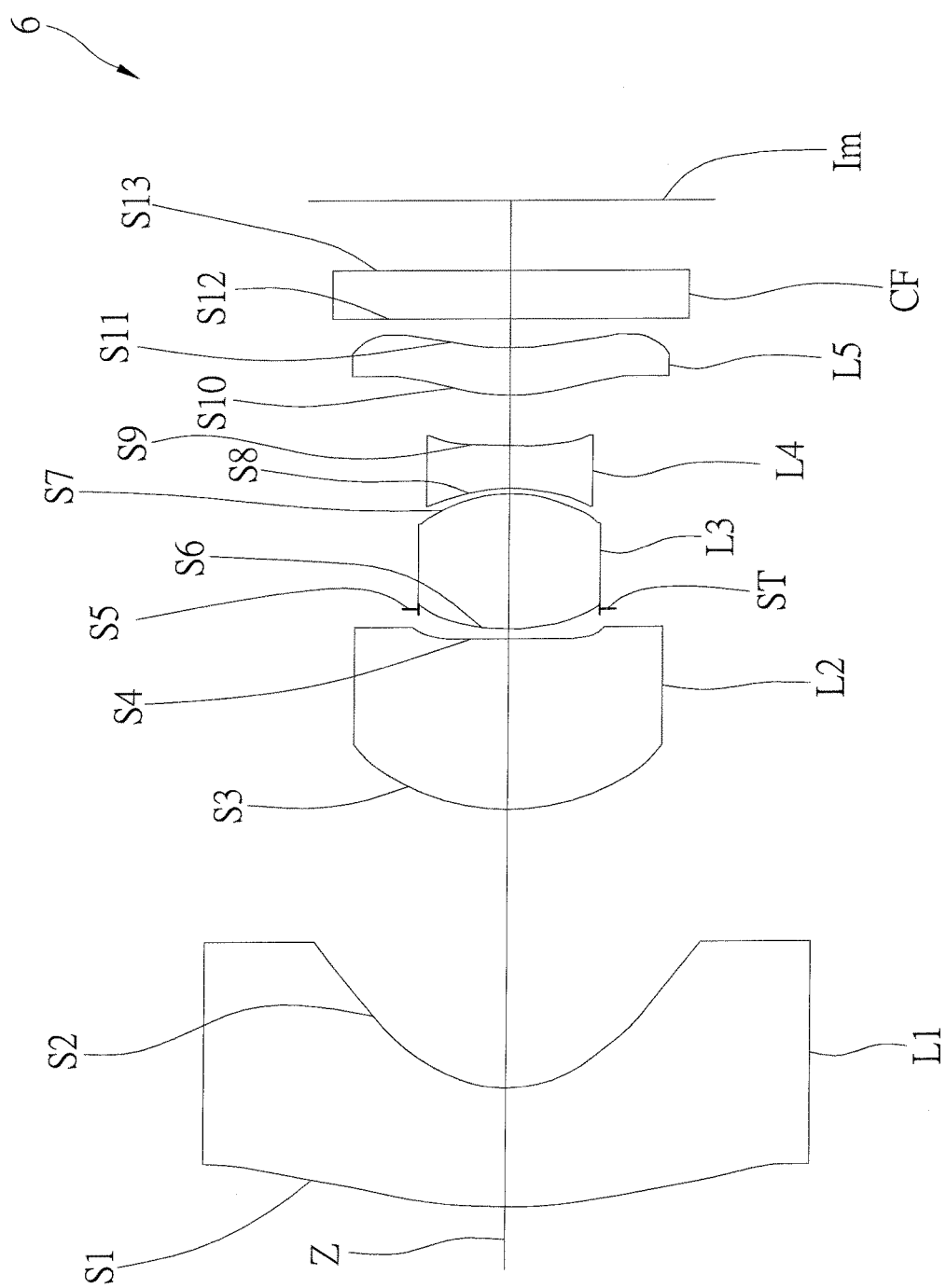
FIG. 11 is a sketch diagram of the arrangement of the lenses of a sixth preferred embodiment of the present invention.

As shown in FIG. 11, a miniature image pickup lens 6 of the sixth preferred embodiment of the present invention includes a first lens L1, a second lens L2, an aperture ST, a third lens L3, a fourth lens L4, a fifth lens L5, and an optical filter CF arranged in sequence along an optical axis Z from an object side to an image side Im.

The first lens L1 is a plastic negative meniscus lens with a convex surface S1 towards the object side and a concave surface S2 towards the image side Im, and both the convex surface S1 and the concave surface S2 are aspheric, which makes the miniature image pickup lens 6 wide-angled. The reason for applying such aspheric surfaces is to correct the distortion, which happens easily for the miniature image pickup lens 6 designed as wide-angled.

The second lens L2 is a plastic positive biconvex lens with two aspheric convex surfaces S3 and S4. The aspheric convex surface S3 of the second lens L2 is helpful to correct the distortion as well, and also the spherical aberration and the field curvature caused by the first lens L1. The sensitivity of the second lens L2 while being manufactured could be lowered too. In addition, a radius of curvature of an optical axis region of the convex surface S4 of the second lens L2 is positive, and a radius of curvature of the convex surface S4 other than the optical axis region is alternate positive and negative. The optical axis region is a region on the surface of the lens through which the optical axis Z passes. The inflection design of the convex surface S4 of the second lens L2 could effectively reduce coma and astigmatism.

The aperture ST is set between the second lens L2 and the third lens L3, and the purpose is the same with the previous embodiment, which is to lower the angle incident to the image side Im of the light enters the miniature image pickup lens 2, and to symmetrizes the arrangements of the lenses at the opposite sides of the aperture ST. As a result, the luminosity on the image side Im could be increased effectively, the distance between the image plane Im and the lenses L1-L5 could be shortened, and the sensitivity of the miniature image pickup lens 6 while being manufactured could be lowered too.

The third lens L3 is a glass positive biconvex lens with two aspheric convex surfaces S6 and S7. The glass third lens L3 may reduce the sensitivity to the temperature to make the miniature image pickup lens 6 have a stable optical performance.

The fourth lens L4 is a plastic negative biconcave lens with two aspheric concave surfaces S8 and S9. The function of the arrangement of the third lens L3 and the fourth lens L4 is the same as above, the miniature image pickup lens 6 could have a shorter length than the one with the negative third lens is in front of the positive fourth lens.

The fifth lens L5 is a plastic positive meniscus lens with a convex surface S10 towards the object side and a concave surface S11 towards the image side Im, and both the surfaces S10 and S11 are aspheric. The fifth lens L5 could effectively ameliorate the problems of coma and astigmatism which may happen for the miniature image pickup lens 6, and correct the incident angle of light to the image side Im, and therefore enhance the optical performance of the miniature image pickup lens 6.

The miniature image pickup lens 6 of the present invention further satisfies the following conditions, and again, to make the miniature image pickup lens 6 have the advantages of wide-angle and short total length, and to control the main refractive power of the entire optical system, and to effectively eliminate the chromatic aberration of the miniature image pickup lens 6:

$$0.1 < f/TTL < 0.3; \quad 1)$$

$$0.8 < |f_3/f_4| < 1.25; \quad 2)$$

$$vd_3 - vd_4 > 20; \quad 3)$$

where f is a total focal length of the miniature image pickup lens 6;

TTL is a total length of the miniature image pickup lens 6;

$f_3$ is a focal length of the third lens L3;

$f_4$ is a focal length of the fourth lens L4;

$vd_3$ is a dispersion index of the third lens L3; and $vd_4$ is a dispersion index of the fourth lens L4.

In order to achieve the aforementioned purposes and enhance the optical performance of the miniature image pickup lens 6, Table 11 shows the specifications of the miniature image pickup lens 6 of the third preferred embodiment, including the total focal length of the miniature image pickup lens 6 (f), the total length of the miniature image pickup lens 6 (TTL), the radius of each lens along the optical axis Z (R), the distance between two neighboring surfaces or between the lens and the image side Im along the optical axis Z (D), the refractive index of each lens (Nd), the Abbe number (vd) of each lens, and the focal lengths of each lens (f1-f5):

TABLE 11 f = 3.12 mm
TTL = 14.56 mm

| Side | R(mm) | D(mm) | Nd | Vd | |
|---|---|---|---|---|---|
| S1 | 8.2 | 1.72 | 1.53 | 56 | L1 |
| S2 | 1.9 | 4.03 | | | f1 = −5.14 mm |
| S3 | 3.3 | 2.46 | 1.51 | 57 | L2 |
| S4 | −40.8 | 0.45 | | | f2 = 6.12 mm |
| S5 | ∞ | −0.3 | | | ST |
| S6 | 3.3 | 1.95 | 1.52 | 64 | L3 |
| S7 | −2.1 | 0.08 | | | f3 = 2.84 mm |
| S8 | −2.4 | 0.61 | 1.64 | 24 | L4 |
| S9 | 8.8 | 0.73 | | | f4 = −2.89 mm |
| S10 | 2.6 | 0.68 | 1.53 | 56 | L5 |
| S11 | 3.4 | 0.42 | | | f5 = 16.83 mm |
| S12 | ∞ | 0.7 | | | CF |
| S13 | ∞ | 1.03 | | | |

In this third preferred embodiment, the conic constants (k) and the coefficients of each order $\alpha_2$-$\alpha_8$ of each aspheric surface are shown in Table 12.

TABLE 12

| | k | $\alpha_2$ | $\alpha_3$ | $\alpha_4$ |
|---|---|---|---|---|
| S1 | 0.167614 | −0.001263 | −0.000112 | 0.000009 |
| S2 | −0.815515 | 0.004350 | −0.000832 | 0.000011 |
| S3 | 0.098614 | 0.000212 | 0.000368 | −0.000092 |
| S4 | −10164.146966 | 0.017092 | 0.006935 | 0.002034 |
| S6 | 1.827459 | 0.011792 | 0.001642 | 0.000210 |
| S7 | −0.134323 | 0.005701 | −0.001697 | −0.000898 |
| S8 | 0.505436 | 0.048946 | −0.020393 | −0.000882 |
| S9 | 21.446630 | 0.018020 | 0.020127 | −0.013515 |
| S10 | −0.010688 | −0.066189 | 0.018481 | −0.004696 |
| S11 | 0.311210 | −0.049543 | 0.011583 | −0.002376 |

| | $\alpha_5$ | $\alpha_6$ | $\alpha_7$ | $\alpha_8$ |
|---|---|---|---|---|
| S1 | 0.000000 | 0.000000 | 0.000000 | 0.000000 |
| S2 | −0.000009 | 0.000001 | 0.000000 | 0.000000 |
| S3 | −0.000010 | 0.000002 | 0.000001 | 0.000000 |
| S4 | 0.000595 | 0.000180 | 0.000074 | 0.000000 |
| S6 | −0.000075 | −0.000088 | −0.000039 | 0.000000 |
| S7 | −0.000236 | 0.000219 | 0.000384 | 0.000000 |
| S8 | 0.002852 | −0.000560 | 0.000819 | 0.000000 |
| S9 | 0.006233 | −0.000726 | 0.000019 | 0.000000 |
| S10 | 0.000433 | 0.000000 | −0.000001 | 0.000000 |
| S11 | 0.000140 | −0.000002 | −0.000001 | 0.000000 |

Figure 12C:
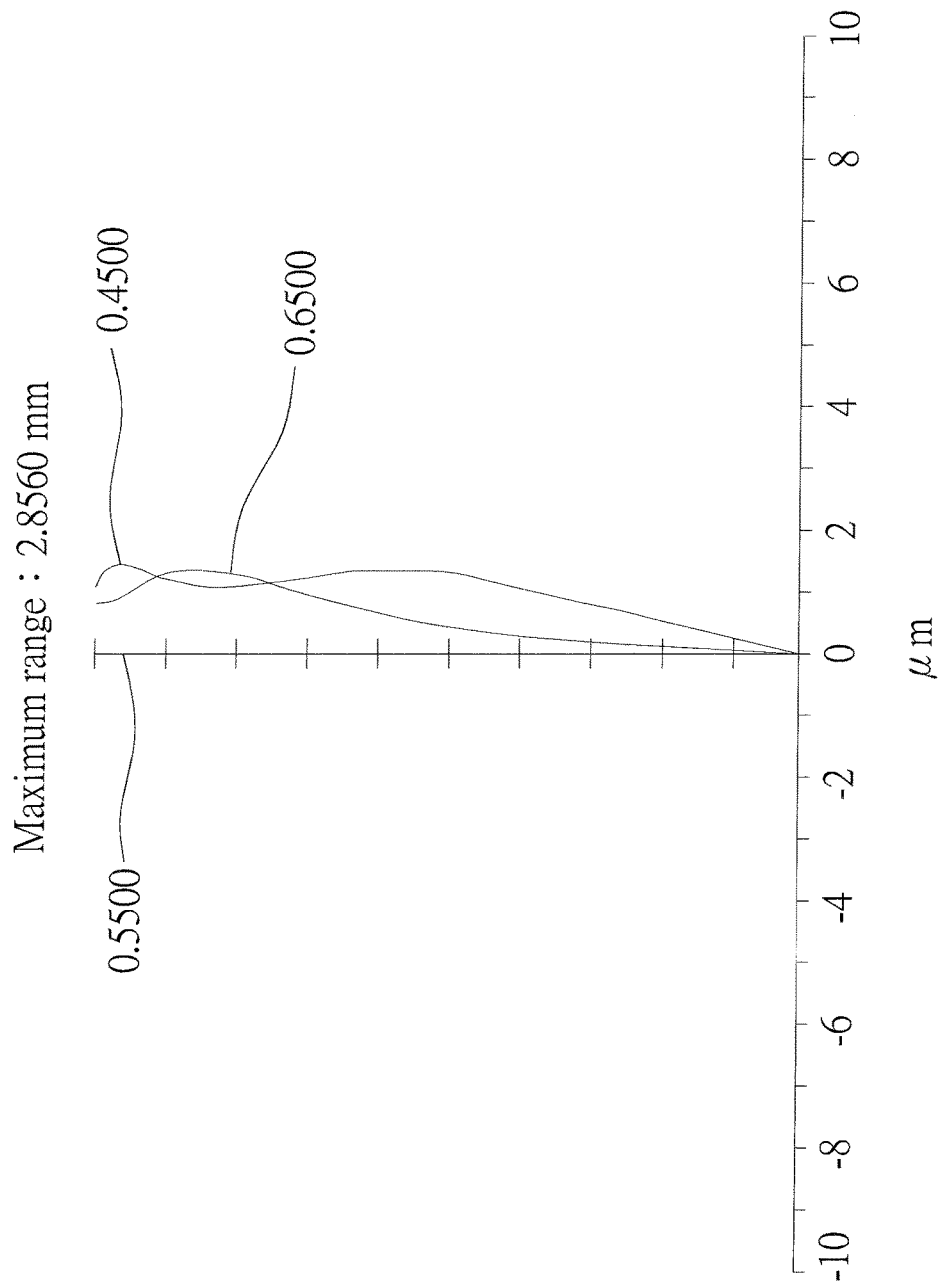
FIG. 12C shows a lateral color aberration diagram of the sixth preferred embodiment of the present invention.

Through the aforementioned arrangements of the lenses L1-L5 and the apertures ST, the image quality of the miniature image pickup lens 6 could satisfy the demand of the market, which could be realized via FIG. 12A to FIG. 12C. FIG. 12A shows that the maximum field curvature of the miniature image pickup lens 6 no exceeds the range from −0.04 mm to 0.04 mm FIG. 12B shows that the maximum distortion of the miniature image pickup lens 6 is no higher than −3% and 2%. As to FIG. 12C, it shows that the maximum lateral color aberration of the miniature image pickup lens 6 is no higher than −1 μm and 2 μm. The results show that the miniature image pickup lens 6 has an excellent optical performance.

[Seventh Preferred Embodiment]

Figure 13:
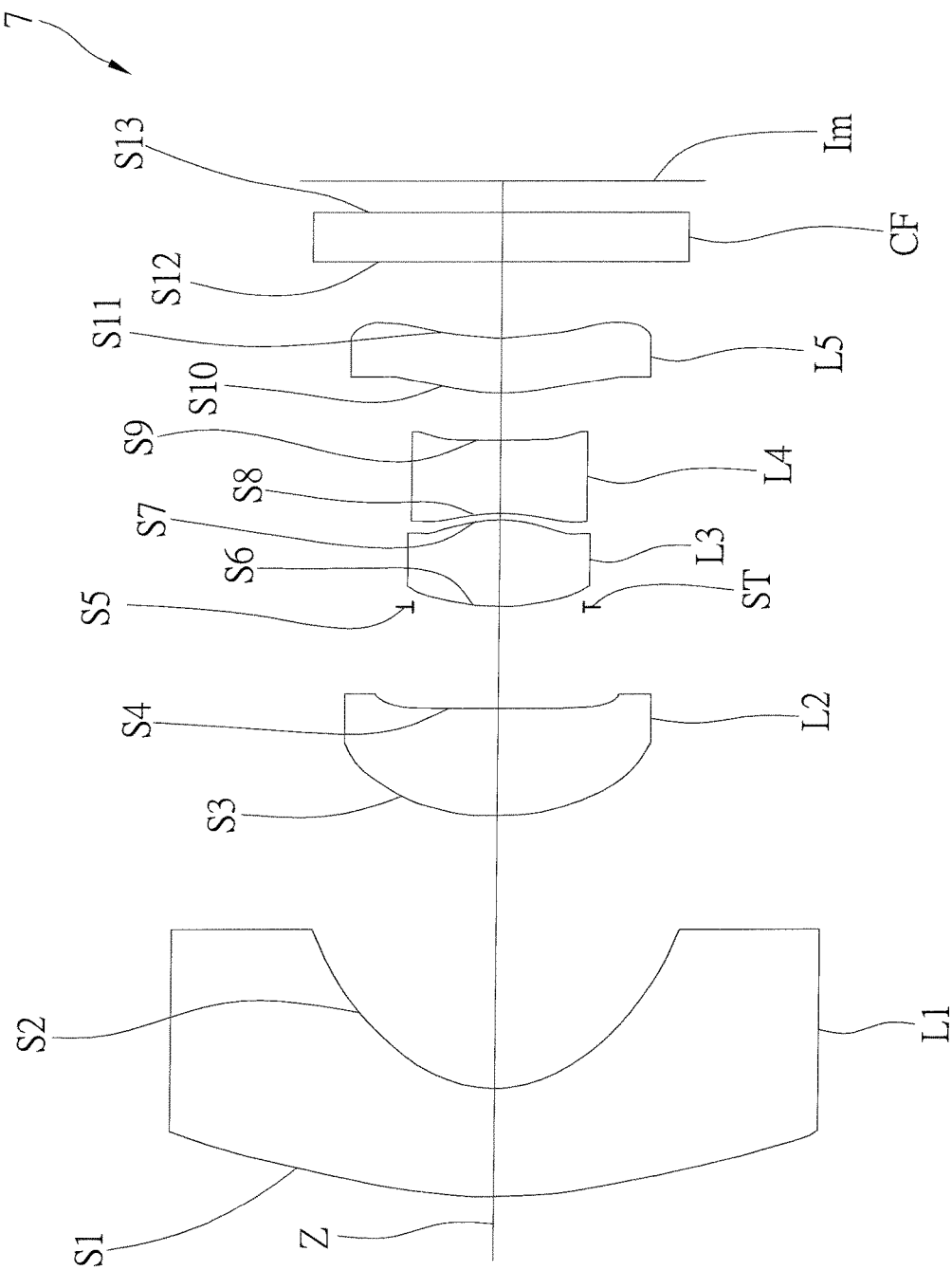
FIG. 13 is a sketch diagram of the arrangement of the lenses of a seventh preferred embodiment of the present invention.

As shown in FIG. 13, a miniature image pickup lens 7 of the seventh preferred embodiment of the present invention includes a first lens L1, a second lens L2, an aperture ST, a third lens L3, a fourth lens L4, a fifth lens L5, and an optical filter CF arranged in sequence along an optical axis Z from an object side to an image side Im.

The first lens L1 is a glass negative meniscus lens with a convex surface S1 towards the object side and a concave surface S2 towards the image side Im, and both the convex surface S1 and the concave surface S2 are aspheric, which makes the miniature image pickup lens 7 wide-angled. The reason for applying such aspheric surfaces is to correct the distortion, which happens easily for the miniature image pickup lens 7 designed as wide-angled.

The second lens L2 is a plastic positive biconvex lens with two aspheric convex surfaces S3 and S4. The aspheric convex surface S3 of the second lens L2 is helpful to correct the distortion as well, and also the spherical aberration and the field curvature caused by the first lens L1. The sensitivity of the second lens L2 while being manufactured could be lowered too. In addition, a radius of curvature of an optical axis region of the convex surface S4 of the second lens L2 is positive, and a radius of curvature of the convex surface S4 other than the optical axis region is alternate positive and negative. The optical axis region is a region on the surface of the lens through which the optical axis Z passes. The inflection design of the convex surface S4 of the second lens L2 could effectively reduce coma and astigmatism.

The aperture ST is set between the second lens L2 and the third lens L3, and the purpose is the same with the previous embodiment, which is to lower the angle incident to the image side Im of the light enters the miniature image pickup lens 2, and to symmetrizes the arrangements of the lenses at the opposite sides of the aperture ST. As a result, the luminosity on the image side Im could be increased effectively, the distance between the image plane Im and the lenses L1-L5 could be shortened, and the sensitivity of the miniature image pickup lens 7 while being manufactured could be lowered too.

The third lens L3 is a glass positive biconvex lens with two aspheric convex surfaces S6 and S7. The glass third lens L3 may reduce the sensitivity to the temperature to make the miniature image pickup lens 7 have a stable optical performance.

The fourth lens L4 is a plastic negative biconcave lens with two aspheric concave surfaces S8 and S9. The function of the arrangement of the third lens L3 and the fourth lens L4 is the same as above, the miniature image pickup lens 7 could have a shorter length than the one with the negative third lens is in front of the positive fourth lens.

The fifth lens L5 is a plastic positive meniscus lens with a convex surface S10 towards the object side and a concave surface S11 towards the image side Im, and both the surfaces S10 and S11 are aspheric. The fifth lens L5 could effectively ameliorate the problems of coma and astigmatism which may happen for the miniature image pickup lens 7, and correct the incident angle of light to the image side Im, and therefore enhance the optical performance of the miniature image pickup lens 7.

The miniature image pickup lens 7 of the present invention further satisfies the following conditions, and again, to make the miniature image pickup lens 7 have the advantages of wide-angle and short total length, and to control the main refractive power of the entire optical system, and to effectively eliminate the chromatic aberration of the miniature image pickup lens 7:

$$0.1 < f/TTL < 0.3; \quad 1)$$

$$0.8 < |f_3/f_4| < 1.25; \quad 2)$$

$$vd_3 - vd_4 > 20; \quad 3)$$

where
f is a total focal length of the miniature image pickup lens 7;

TTL is a total length of the miniature image pickup lens 7;

$f_3$ is a focal length of the third lens L3;

$f_4$ is a focal length of the fourth lens L4;

$vd_3$ is a dispersion index of the third lens L3; and $vd_4$ is a dispersion index of the fourth lens L4.

In order to achieve the aforementioned purposes and enhance the optical performance of the miniature image pickup lens 7, Table 13 shows the specifications of the miniature image pickup lens 7 of the third preferred embodiment, including the total focal length of the miniature image pickup lens 7 (f), the total length of the miniature image pickup lens 7 (TTL), the radius of each lens along the optical axis Z (R), the distance between two neighboring surfaces or between the lens and the image side Im along the optical axis Z (D), the refractive index of each lens (Nd), the Abbe number (vd) of each lens, and the focal lengths of each lens (f1-f5):

TABLE 13 f = 3.15 mm
TTL = 14.64 mm

| Side | R(mm) | D(mm) | Nd | Vd | | |
|------|-------|-------|------|----|----|----|
| S1 | 8.1 | 1.55 | 1.52 | 64 | L1 | |
| S2 | 1.9 | 3.94 | | | | f1 = −5.19 mm |
| S3 | 3.5 | 1.55 | 1.51 | 57 | L2 | |
| S4 | −79 | 1.46 | | | | f2 = 6.54 mm |
| S5 | ∞ | 0.01 | | | ST | |
| S6 | 3.5 | 1.25 | 1.52 | 64 | L3 | |
| S7 | −2.2 | 0.1 | | | | f3 = 2.78 mm |
| S8 | −2.7 | 1.04 | 1.64 | 24 | L4 | |
| S9 | 10.4 | 0.68 | | | | f4 = −3.26 mm |
| S10 | 2.7 | 0.8 | 1.53 | 56 | L5 | |
| S11 | 3.3 | 1.1 | | | | f5 = 20.6 mm |
| S12 | ∞ | 0.7 | | | CF | |
| S13 | ∞ | 0.46 | | | | |

In this third preferred embodiment, the conic constants (k) and the coefficients of each order $\alpha_2$-$\alpha_8$ of each aspheric surface are shown in Table 14.

TABLE 14

| | k | $\alpha_2$ | $\alpha_3$ | $\alpha_4$ |
|---|---|---|---|---|
| S1 | 0.276863 | −0.00124 | −0.00011 | 0.000009 |
| S2 | −0.8047 | 0.004499 | −0.00087 | 0.00004 |
| S3 | 0.258499 | 0.000738 | 0.000706 | −0.00011 |
| S4 | −26152.7 | 0.003132 | 0.001175 | 0.000037 |
| S6 | 0.607158 | 0.002454 | −0.0008 | −0.00025 |
| S7 | −0.72853 | 0.01442 | 0.01332 | 0.007008 |
| S8 | −0.09654 | 0.057495 | −0.0145 | 0.008447 |
| S9 | −13.9574 | 0.011274 | 0.026892 | −0.0113 |
| S10 | 0.078023 | −0.06552 | 0.019343 | −0.00434 |
| S11 | 0.447508 | −0.04893 | 0.011591 | −0.00239 |

| | $\alpha_5$ | $\alpha_6$ | $\alpha_7$ | $\alpha_8$ |
|---|---|---|---|---|
| S1 | 0.000000 | 0.000000 | 0.000000 | 0.000000 |
| S2 | −2E−06 | 0.000002 | 0.000000 | 0.000000 |
| S3 | −1.1E−05 | 0.000009 | 0.000002 | 0.000000 |
| S4 | 0.000025 | 0.000063 | 0.000022 | 0.000000 |
| S6 | 0.000176 | 0.000317 | 0.000337 | 0.000000 |
| S7 | 0.002404 | 0.000674 | 0.00116 | 0.000000 |
| S8 | 0.007946 | 0.000153 | −0.00129 | 0.000000 |
| S9 | 0.005008 | −0.00246 | 0.000104 | 0.000000 |
| S10 | 0.000599 | −4.1E−05 | −3.1E−05 | 0.000000 |
| S11 | 0.00017 | 0.000004 | −6E−06 | 0.000000 |

Figure 14C:
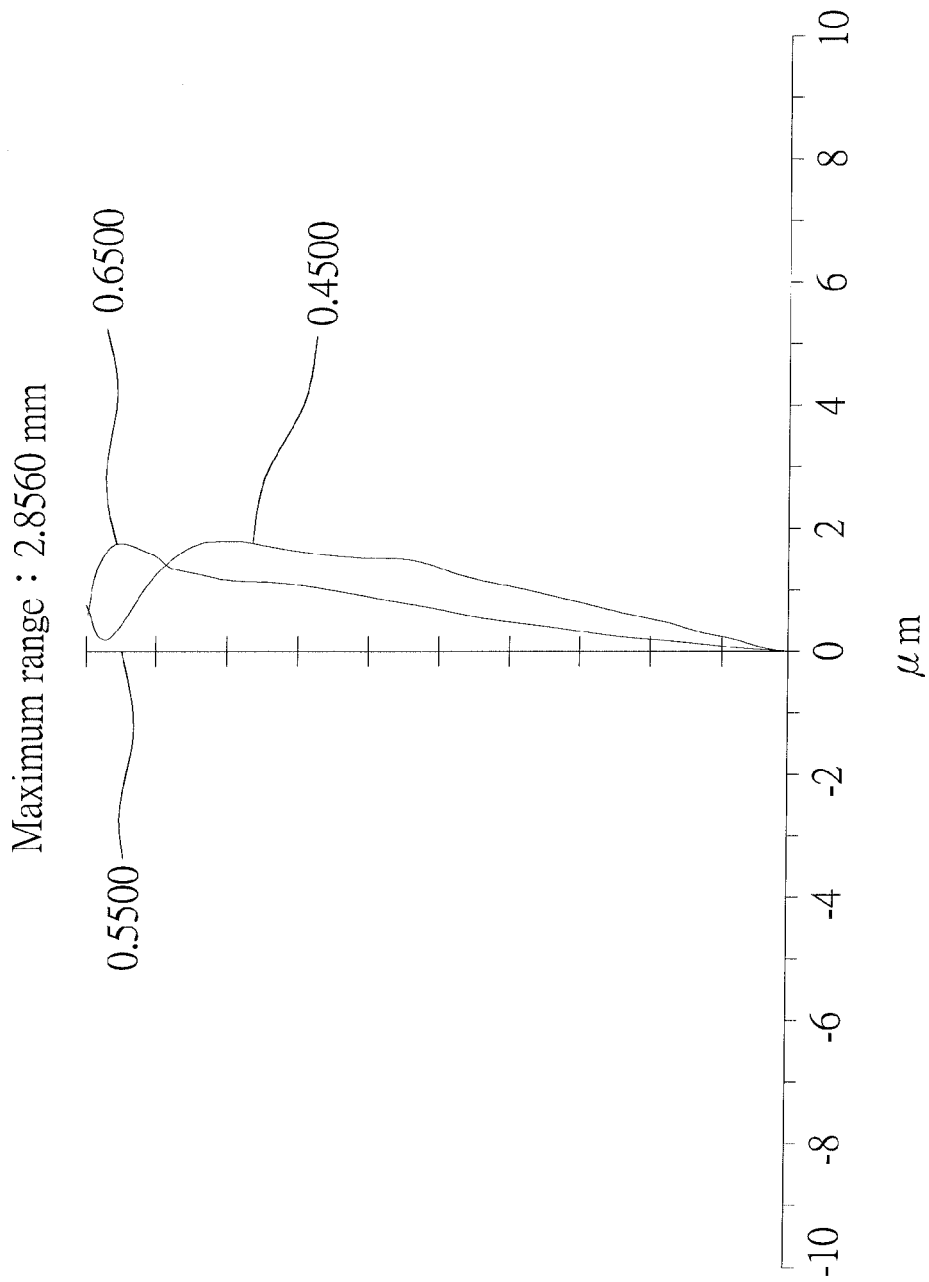
FIG. 14C shows a lateral color aberration diagram of the seventh preferred embodiment of the present invention.

Through the aforementioned arrangements of the lenses L1-L5 and the apertures ST, the image quality of the miniature image pickup lens 7 could satisfy the demand of the market, which could be realized via FIG. 14A to FIG. 14C. FIG. 14A shows that the maximum field curvature of the miniature image pickup lens 7 no exceeds the range from −0.08 mm to 0.06 mm FIG. 14B shows that the maximum distortion of the miniature image pickup lens 7 is no higher than −3% and 2%. As to FIG. 14C, it shows that the maximum lateral color aberration of the miniature image pickup lens 7 is no higher than −1 μm and 2 μm. The results show that the miniature image pickup lens 7 has an excellent optical performance.

[Eighth Preferred Embodiment]

Figure 15:
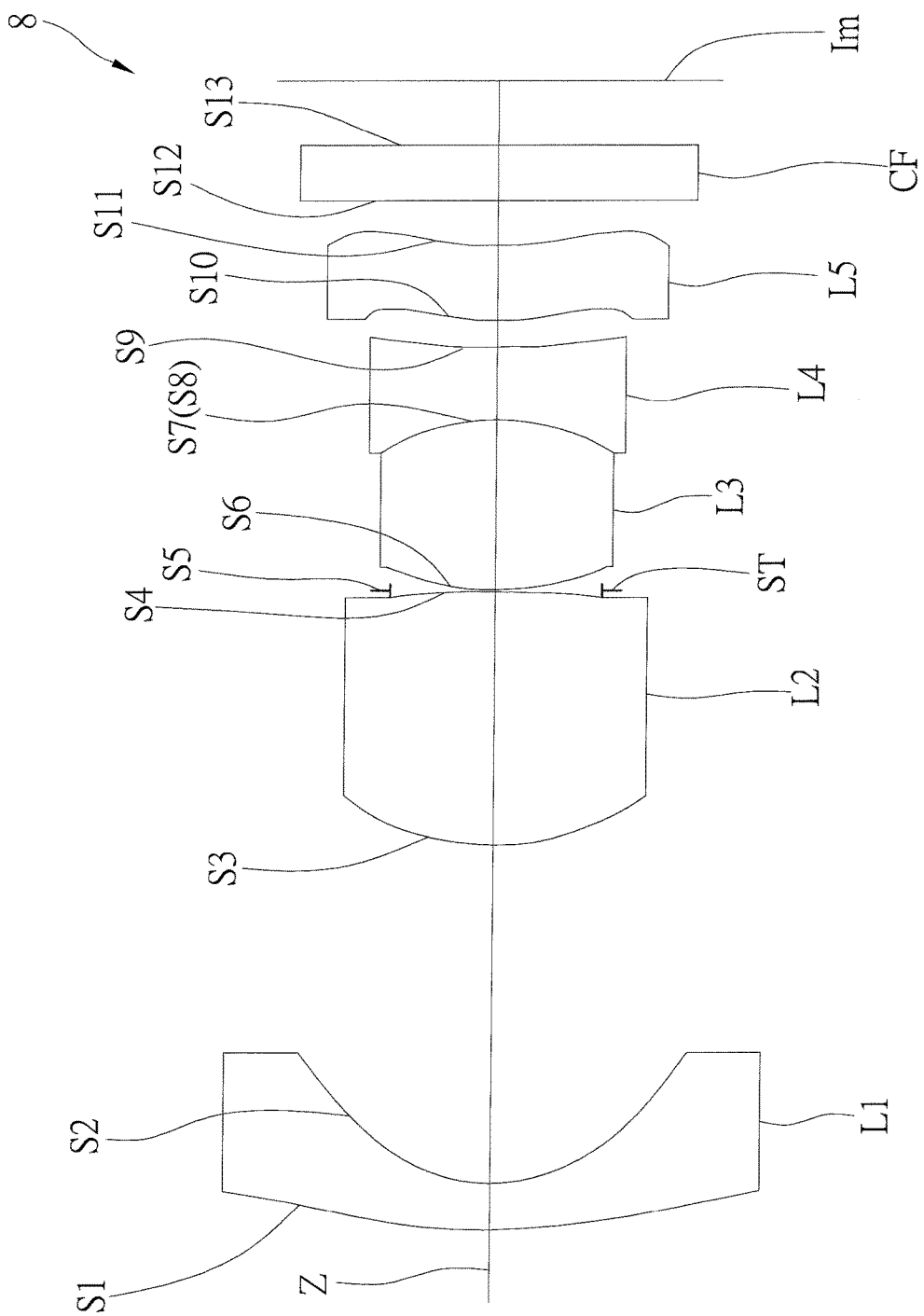
FIG. 15 is a sketch diagram of the arrangement of the lenses of an eighth preferred embodiment of the present invention.

As shown in FIG. 15, a miniature image pickup lens 8 of the eighth preferred embodiment of the present invention includes a first lens L1, a second lens L2, an aperture ST, a third lens L3, a fourth lens L4, a fifth lens L5, and an optical filter CF arranged in sequence along an optical axis Z from an object side to an image side Im.

The first lens L1 is a plastic negative meniscus lens with a convex surface S1 towards the object side and a concave surface S2 towards the image side Im, and both the convex surface S1 and the concave surface S2 are aspheric, which makes the miniature image pickup lens 8 wide-angled. The reason for applying such aspheric surfaces is to correct the distortion, which happens frequently for the miniature image pickup lens 8 designed as wide-angled.

The second lens L2 is a plastic positive biconvex lens with two aspheric convex surfaces S3 and S4. The aspheric convex surface S3 of the second lens L2 is helpful to correct the distortion as well, and also the spherical aberration and the field curvature caused by the first lens L1. The sensitivity of the second lens L2 while being manufactured could be lowered too.

The aperture ST is set between the second lens L2 and the third lens L3, and the purpose is the same with the previous embodiment, which is to lower the angle incident to the image side Im of the light enters the miniature image pickup lens 2, and to symmetrizes the arrangements of the lenses at the opposite sides of the aperture ST. As a result, the luminosity on the image side Im could be increased effectively, the distance between the image plane Im and the lenses L1-L5 could be shortened, and the sensitivity of the miniature image pickup lens 8 while being manufactured could be lowered too.

The third lens L3 is a glass positive biconvex lens with two spherical convex surfaces S6 and S7. The glass third lens L3 may reduce the sensitivity to the temperature to make the miniature image pickup lens 8 have a stable optical performance.

The fourth lens L4 is a glass negative biconcave lens with two spherical concave surfaces S8 and S9. The concave surface S8 of the fourth lens L4 is jointed to the convex surface S7 of the third lens L3 to form a compound lens. The function of the arrangement of the third lens L3 and the fourth lens L4 is the same as above, the miniature image pickup lens 8 could have a shorter length than the one with the negative third lens is in front of the positive fourth lens.

The fifth lens L5 is a plastic positive meniscus lens with a convex surface S10 towards the object side and a concave surface S11 towards the image side Im, and both the surfaces S10 and S11 are aspheric. The fifth lens L5 could effectively ameliorate the problems of coma and astigmatism which may happen for the miniature image pickup lens 8, and correct the incident angle of light to the image side Im, and therefore enhance the optical performance of the miniature image pickup lens 8.

The miniature image pickup lens 8 of the present invention further satisfies the following conditions, and again, to make the miniature image pickup lens 8 have the advantages of wide-angle and short total length, and to control the main refractive power of the entire optical system, and to effectively eliminate the chromatic aberration of the miniature image pickup lens 8:

$$0.1 < f/TTL < 0.3; \qquad 1)$$

$$0.8 < |f_3/f_4| < 1.25; \qquad 2)$$

$$vd_3 - vd_4 > 20; \qquad 3)$$

where f is a total focal length of the miniature image pickup lens 8;
TTL is a total length of the miniature image pickup lens 8;
$f_3$ is a focal length of the third lens L3;
$f_4$ is a focal length of the fourth lens L4;
$vd_3$ is a dispersion index of the third lens L3; and
$vd_4$ is a dispersion index of the fourth lens L4.

In order to achieve the aforementioned purposes and enhance the optical performance of the miniature image pickup lens 8, Table 15 shows the specifications of the miniature image pickup lens 8 of the third preferred embodiment, including the total focal length of the miniature image pickup lens 8 (f), the total length of the miniature image pickup lens 8 (TTL), the radius of each lens along the optical axis Z (R), the distance between two neighboring surfaces or between the lens and the image side Im along the optical axis Z (D), the refractive index of each lens (Nd), the Abbe number (vd) of each lens, and the focal lengths of each lens (f1-f5):

TABLE 15 f = 3.46 mm
TTL = 14.73 mm

| Side | R(mm) | D(mm) | Nd | Vd | |
|------|-------|-------|------|----|------|
| S1 | 8.2 | 0.6 | 1.53 | 56 | L1 |
| S2 | 2.1 | 4.33 | | | f1 = −5.47 mm |
| S3 | 3.2 | 3.25 | 1.51 | 57 | L2 |
| S4 | −11.9 | 0.01 | | | f2 = 5.29 mm |
| S5 | ∞ | 0.02 | | | ST |
| S6 | 3.8 | 2.17 | 1.52 | 64 | L3 |
| S7 | −2.9 | 0.00 | | | f3 = 3.56 mm |
| S8 | −2.9 | 0.94 | 1.76 | 27 | L4 |
| S9 | 10.9 | 0.33 | | | f4 = −2.89 mm |
| S10 | 2.9 | 0.95 | 1.53 | 56 | L5 |
| S11 | 3.4 | 0.59 | | | f5 = 23.12 mm |
| S12 | ∞ | 0.7 | | | CF |
| S13 | ∞ | 0.84 | | | |

In this third preferred embodiment, the conic constants (k) and the coefficients of each order $\alpha_2$-$\alpha_8$ of each aspheric surface are shown in Table 16.

TABLE 16

| | k | $\alpha_2$ | $\alpha_3$ | $\alpha_4$ |
|----|-----------|-----------|-----------|-----------|
| S1 | −0.072063 | −0.001328 | −0.000117 | 0.000009 |
| S2 | −0.806298 | 0.004007 | −0.000686 | 0.000031 |
| S3 | −0.146280 | −0.000970 | −0.000276 | 0.000071 |
| S4 | −412.789652 | −0.007047 | −0.001413 | 0.000159 |
| S10 | 0.030429 | −0.067621 | 0.015821 | −0.005000 |
| S11 | 0.369578 | −0.049212 | 0.011148 | −0.002472 |

| | $\alpha_5$ | $\alpha_6$ | $\alpha_7$ | $\alpha_8$ |
|----|-----------|-----------|-----------|-----------|
| S1 | 0.000000 | 0.000000 | 0.000000 | 0.000000 |
| S2 | −0.000005 | 0.000001 | 0.000000 | 0.000000 |
| S3 | 0.000019 | 0.000000 | −0.000002 | 0.000000 |

TABLE 16-continued

| S4 | 0.000251 | 0.000078 | −0.000035 | 0.000000 |
| S10 | 0.000385 | −0.000028 | −0.000016 | 0.000000 |
| S11 | 0.000132 | −0.000001 | 0.000000 | 0.000000 |

Figure 16C:
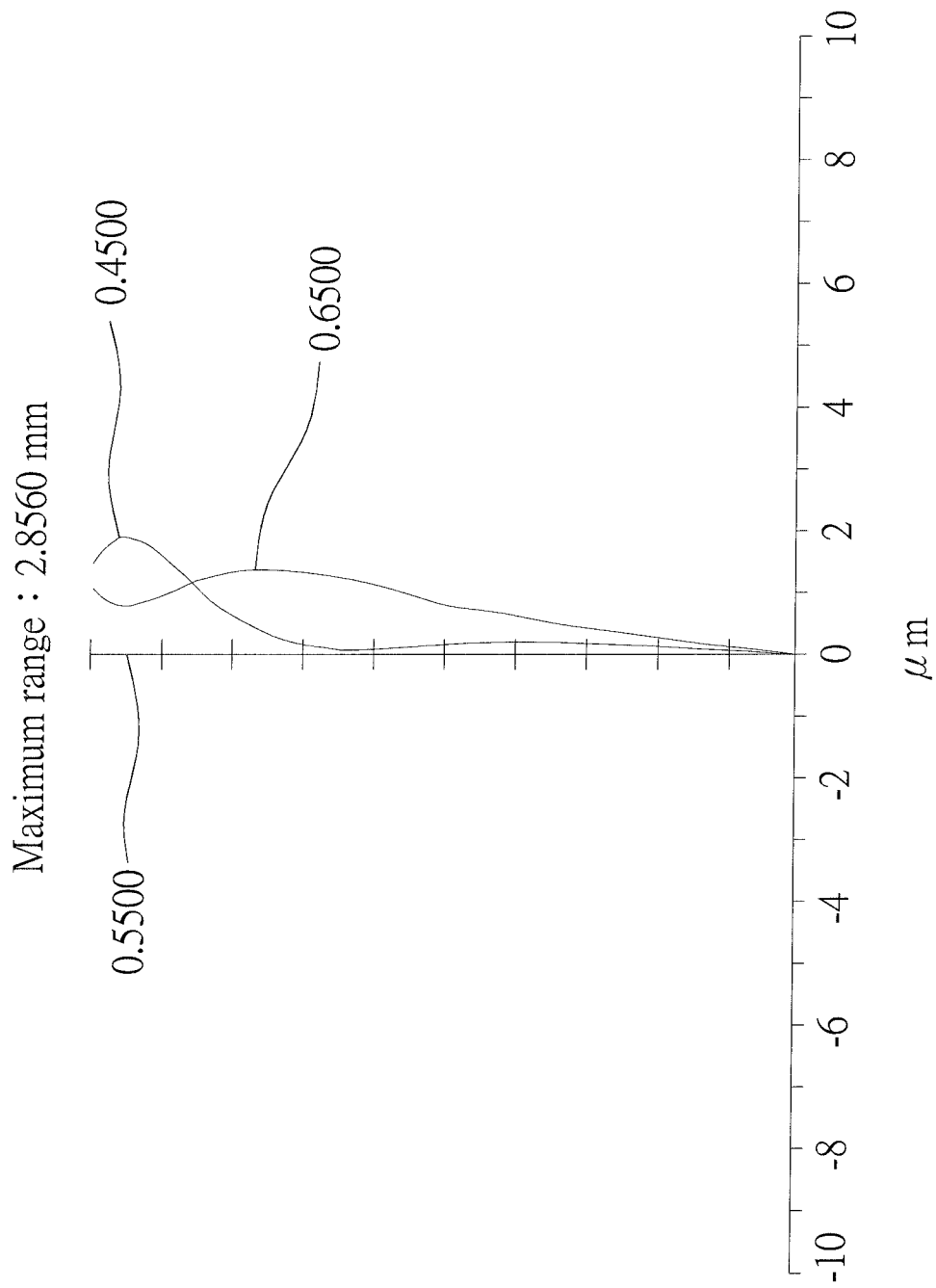
FIG. 16C shows a lateral color aberration diagram of the eighth preferred embodiment of the present invention.

Through the aforementioned arrangements of the lenses L1-L5 and the apertures ST, the image quality of the miniature image pickup lens 8 could satisfy the demand of the market, which could be realized via FIG. 16A to FIG. 16C. FIG. 16A shows that the maximum field curvature of the miniature image pickup lens 8 no exceeds the range from −0.08 mm to 0.06 mm FIG. 16B shows that the maximum distortion of the miniature image pickup lens 8 is no higher than −3% and 2%. As to FIG. 16C, it shows that the maximum lateral color aberration of the miniature image pickup lens 8 is no higher than −1 μm and 2 μm. The results show that the miniature image pickup lens 8 has an excellent optical performance.

[Ninth Preferred Embodiment]

Figure 17:
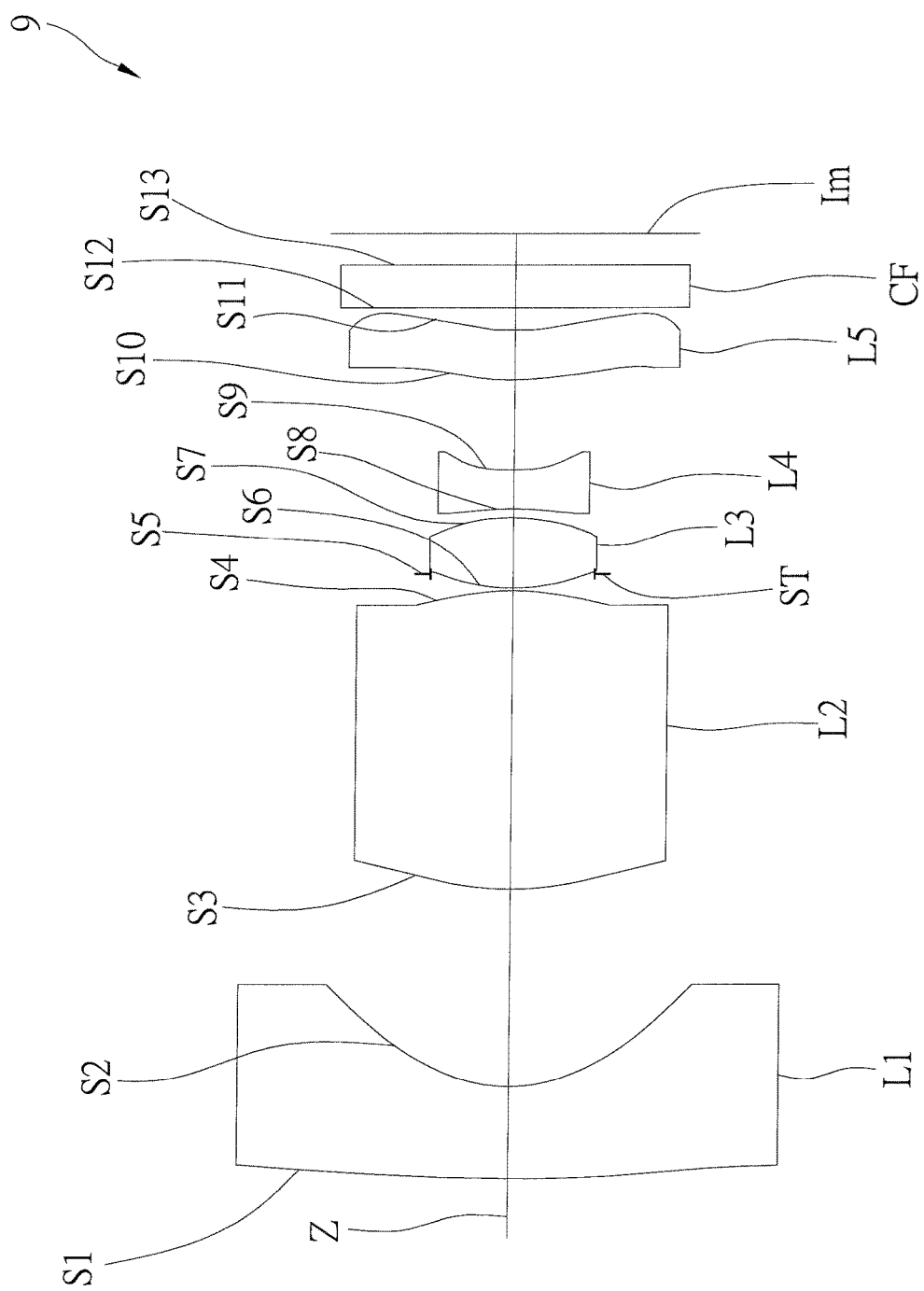
FIG. 17 is a sketch diagram of the arrangement of the lenses of a ninth preferred embodiment of the present invention.

As shown in FIG. 17, a miniature image pickup lens 9 of the ninth preferred embodiment of the present invention includes a first lens L1, a second lens L2, an aperture ST, a third lens L3, a fourth lens L4, a fifth lens L5, and an optical filter CF arranged in sequence along an optical axis Z from an object side to an image side Im.

The first lens L1 is a plastic negative meniscus lens with a convex surface S1 towards the object side and a concave surface S2 towards the image side Im, and both the convex surface S1 and the concave surface S2 are aspheric, which makes the miniature image pickup lens 9 wide-angled. The reason for applying such aspheric surfaces is to correct the distortion, which happens easily for the miniature image pickup lens 9 designed as wide-angled.

The second lens L2 is a plastic positive biconvex lens with two aspheric convex surfaces S3 and S4. The aspheric convex surface S3 of the second lens L2 is helpful to correct the distortion as well, and also the spherical aberration and the field curvature caused by the first lens L1. The sensitivity of the second lens L2 while being manufactured could be lowered too.

The aperture ST is set between the second lens L2 and the third lens L3, and the purpose is the same with the previous embodiment, which is to lower the angle incident to the image side Im of the light enters the miniature image pickup lens 2, and to symmetrizes the arrangements of the lenses at the opposite sides of the aperture ST. As a result, the luminosity on the image side Im could be increased effectively, the distance between the image plane Im and the lenses L1-L5 could be shortened, and the sensitivity of the miniature image pickup lens 9 while being manufactured could be lowered too.

The third lens L3 is a plastic positive biconvex lens with two aspheric convex surfaces S6 and S7.

The fourth lens L4 is a plastic negative biconcave lens with two aspheric concave surfaces S8 and S9. The function of the arrangement of the third lens L3 and the fourth lens L4 is the same as above, the miniature image pickup lens 9 could have a shorter length than the one with the negative third lens is in front of the positive fourth lens.

The fifth lens L5 is a plastic positive meniscus lens with a convex surface S10 towards the object side and a concave surface S11 towards the image side Im, and both the surfaces S10 and S11 are aspheric. The fifth lens L5 could effectively ameliorate the problems of coma and astigmatism which may happen for the miniature image pickup lens 9, and correct the incident angle of light to the image side Im, and therefore enhance the optical performance of the miniature image pickup lens 9.

The miniature image pickup lens 9 of the present invention further satisfies the following conditions, and again, to make the miniature image pickup lens 9 have the advantages of wide-angle and short total length, and to control the main refractive power of the entire optical system, and to effectively eliminate the chromatic aberration of the miniature image pickup lens 9:

$$0.1 < f/TTL < 0.3; \quad 1)$$

$$0.8 < |f_3/f_4| < 1.25; \quad 2)$$

$$vd_3 - vd_4 > 20; \quad 3)$$

where f is a total focal length of the miniature image pickup lens 9;

TTL is a total length of the miniature image pickup lens 9;

$f_3$ is a focal length of the third lens L3;

$f_4$ is a focal length of the fourth lens L4;

$vd_3$ is a dispersion index of the third lens L3; and $vd_4$ is a dispersion index of the fourth lens L4.

In order to achieve the aforementioned purposes and enhance the optical performance of the miniature image pickup lens 9, Table 17 shows the specifications of the miniature image pickup lens 9 of the third preferred embodiment, including the total focal length of the miniature image pickup lens 9 (f), the total length of the miniature image pickup lens 9 (TTL), the radius of each lens along the optical axis Z (R), the distance between two neighboring surfaces or between the lens and the image side Im along the optical axis Z (D), the refractive index of each lens (Nd), the Abbe number (vd) of each lens, and the focal lengths of each lens (f1-f5):

TABLE 17 f = 3.28 mm
TTL = 15.17 mm

| Side | R(mm) | D(mm) | Nd | Vd | |
|---|---|---|---|---|---|
| S1 | 22.4 | 1.47 | 1.54 | 56 | L1 |
| S2 | 2.5 | 3.16 | | | f1 = −5.34 mm |
| S3 | 4.6 | 4.79 | 1.53 | 56 | L2 |
| S4 | −4.6 | 0.27 | | | f2 = 5.25 mm |
| S5 | ∞ | −0.22 | | | ST |
| S6 | 3.3 | 1.14 | 1.51 | 56 | L3 |
| S7 | −3 | 0.13 | | | f3 = 3.25 mm |
| S8 | −3.9 | 0.64 | 1.64 | 24 | L4 |
| S9 | 3.8 | 1.43 | | | f4 = −2.93 mm |
| S10 | 3.7 | 0.79 | 1.53 | 56 | L5 |
| S11 | 3.5 | 0.35 | | | f5 = 695.06 mm |
| S12 | ∞ | 0.7 | | | CF |
| S13 | ∞ | 0.52 | | | |

In this third preferred embodiment, the conic constants (k) and the coefficients of each order $\alpha_2$-$\alpha_8$ of each aspheric surface are shown in Table 18.

TABLE 18

| | k | $\alpha_2$ | $\alpha_3$ | $\alpha_4$ |
|---|---|---|---|---|
| S1 | 0.556135 | −0.000504 | −0.000041 | 0.000004 |
| S2 | −0.967774 | 0.001875 | −0.000412 | 0.000007 |
| S3 | 0.071620 | −0.004868 | −0.000375 | −0.000071 |
| S4 | 0.166404 | −0.001986 | 0.007405 | −0.003024 |

TABLE 18-continued

|     | S6  | 1.210414   | -0.006353 | 0.012223  | -0.006056 |
|-----|-----|------------|-----------|-----------|-----------|
|     | S7  | 0.295294   | 0.005634  | 0.011319  | -0.009297 |
|     | S8  | -15.758053 | 0.063961  | -0.011074 | -0.014893 |
|     | S9  | 0.505538   | 0.050968  | 0.030421  | 0.000652  |
|     | S10 | -0.035137  | -0.040656 | 0.008612  | -0.001534 |
|     | S11 | 0.167671   | -0.036175 | 0.005927  | -0.000797 |

|     | $\alpha_5$ | $\alpha_6$ | $\alpha_7$ | $\alpha_8$ |
|-----|-----------|-----------|-----------|-----------|
| S1  | 0.000000  | 0.000000  | 0.000000  | 0.000000  |
| S2  | -0.000001 | 0.000000  | 0.000000  | 0.000000  |
| S3  | 0.000010  | 0.000000  | 0.000000  | 0.000000  |
| S4  | 0.000703  | 0.000001  | -0.000002 | 0.000000  |
| S6  | 0.000643  | -0.000385 | -0.000321 | 0.000000  |
| S7  | 0.002884  | -0.000227 | -0.000371 | 0.000000  |
| S8  | 0.004599  | 0.000152  | 0.000037  | 0.000000  |
| S9  | -0.002528 | -0.002730 | -0.000788 | 0.000000  |
| S10 | 0.000122  | 0.000000  | 0.000000  | 0.000000  |
| S11 | 0.000034  | -0.000001 | 0.000000  | 0.000000  |

Figure 18C:
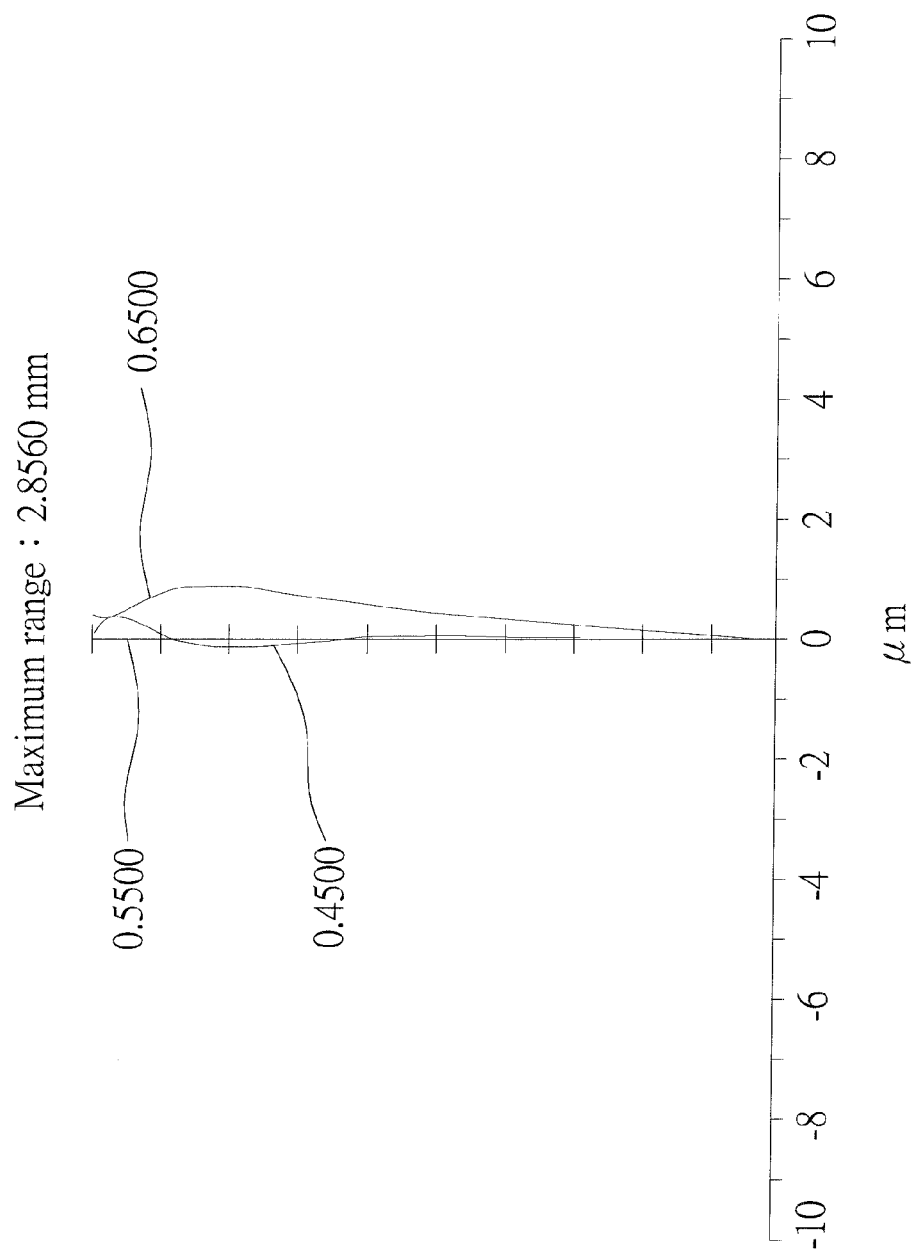
FIG. 18C shows a lateral color aberration diagram of the ninth preferred embodiment of the present invention.

Through the aforementioned arrangements of the lenses L1-L5 and the apertures ST, the image quality of the miniature image pickup lens 9 could satisfy the demand of the market, which could be realized via FIG. 18A to FIG. 18C. FIG. 18A shows that the maximum field curvature of the miniature image pickup lens 9 no exceeds the range from −0.02 mm to 0.02 mm. FIG. 18B shows that the maximum distortion of the miniature image pickup lens 9 is no higher than −2% and 2%. As to FIG. 18C, it shows that the maximum lateral color aberration of the miniature image pickup lens 9 is no higher than −1 µm and 1 µm. The results show that the optical performance of the miniature image pickup lens 9 is qualified.

It must be pointed out that the embodiments described above are only some preferred embodiments of the present invention. All equivalent structures which employ the concepts disclosed in this specification and the appended claims should fall within the scope of the present invention.

What is claimed is:

1. A miniature image pickup lens, in sequence along an optical axis from an object side to an image side, comprising:
    a first lens, which is a negative meniscus lens with a convex surface towards the object side and a concave surface towards the image side;
    a second lens, which is a positive biconvex lens;
    an aperture;
    a third lens, which is a positive biconvex lens;
    a fourth lens, which is a negative biconcave lens; and
    a fifth lens having a convex surface towards the object side.

2. The miniature image pickup lens as defined in claim 1, wherein one surface of the first lens is aspheric at least.

3. The miniature image pickup lens as defined in claim 1, wherein the first lens is made of plastic.

4. The miniature image pickup lens as defined in claim 1, wherein the first lens is made of glass.

5. The miniature image pickup lens as defined in claim 1, wherein the second lens is made of plastic, and one surface of the second lens is aspheric at least.

6. The miniature image pickup lens as defined in claim 1, wherein the second lens is made of glass, and one surface of the second lens is aspheric at least.

7. The miniature image pickup lens as defined in claim 1, wherein the second lens is made of glass, and one surface of the second lens is spherical at least.

8. The miniature image pickup lens as defined in claim 1, wherein the third lens is made of plastic, and one surface of the third lens is aspheric at least.

9. The miniature image pickup lens as defined in claim 1, wherein the third lens is made of glass, and one surface of the third lens is aspheric at least.

10. The miniature image pickup lens as defined in claim 1, wherein the third lens is made of glass, and one surface of the third lens is spherical at least.

11. The miniature image pickup lens as defined in claim 1, wherein the fourth lens is made of plastic, and one surface of the fourth lens is aspheric at least.

12. The miniature image pickup lens as defined in claim 1, wherein the fourth lens is made of glass, and one surface of the fourth lens is aspheric at least.

13. The miniature image pickup lens as defined in claim 1, wherein the fourth lens is made of glass, and one surface of the fourth lens is spherical at least.

14. The miniature image pickup lens as defined in claim 1, wherein the fourth lens is jointed to the third lens to form a compound lens.

15. The miniature image pickup lens as defined in claim 1, wherein the fifth lens is a positive lens.

16. The miniature image pickup lens as defined in claim 1, wherein the fifth lens is a negative lens.

17. The miniature image pickup lens as defined in claim 1, wherein the fifth lens is a meniscus lens with a concave surface towards the image side.

18. The miniature image pickup lens as defined in claim 1, wherein the fifth lens is made of plastic, and one surface of the fifth lens is aspheric at least.

19. The miniature image pickup lens as defined in claim 1, wherein the miniature image pickup lens satisfies:

$$0.1 < f/TTL < 0.3$$

where f is a total focal length of the miniature image pickup lens, and TTL is a total length of the miniature image pickup lens.

20. The miniature image pickup lens as defined in claim 1, wherein the miniature image pickup lens satisfies:

$$0.8 < |f_3/f_4| < 1.25$$

where $f_3$ is a focal length of the third lens, and $f_4$ is a focal length of the fourth lens.

21. The miniature image pickup lens as defined in claim 1, wherein the miniature image pickup lens satisfies:

$$Vd_3 - vd_4 > 20$$

where $vd_3$ is a dispersion index of the third lens, and $vd_4$ is a dispersion index of the fourth lens.

22. A miniature image pickup lens, in sequence along an optical axis from an object side to an image side, comprising:
    a first lens, which is a negative meniscus lens with a convex surface towards the object side and a concave surface towards the image side;
    a second lens, which is a positive lens with a convex surface towards the object side;
    an aperture;
    a third lens, which is a positive biconvex lens;
    a fourth lens, which is a negative biconcave lens; and
    a fifth lens having a convex surface towards the object side;
    wherein the fifth lens is a meniscus lens with a concave surface towards the image side.

23. The miniature image pickup lens as defined in claim 22, wherein the fourth lens is jointed to the third lens to form a compound lens.

24. The miniature image pickup lens as defined in claim 22, wherein the fifth lens is a negative lens.

25. The miniature image pickup lens as defined in claim 22, wherein the fifth lens is a positive lens.

26. The miniature image pickup lens as defined in claim 22, wherein the miniature image pickup lens satisfies:

$$0.8<|f3/f4|<1.25$$

where f3 is a focal length of the third lens, and f4 is a focal length of the fourth lens.

27. A miniature image pickup lens, in sequence along an optical axis from an object side to an image side, comprising:
   a first lens, which is a negative meniscus lens with a convex surface towards the object side and a concave surface towards the image side;
   a second lens, which is a positive lens with a convex surface towards the object side;
   an aperture;
   a third lens, which is a positive biconvex lens;
   a fourth lens, which is a negative biconcave lens; and
   a fifth lens having a convex surface towards the object side;
   wherein the miniature image pickup lens satisfies:

$$0.8<|f3/f4|<1.25$$

where f3 is a focal length of the third lens, and f4 is a focal length of the fourth lens.

28. The miniature image pickup lens as defined in claim 27, wherein the fourth lens is jointed to the third lens to form a compound lens.

29. The miniature image pickup lens as defined in claim 27, wherein the fifth lens is a negative lens.

30. The miniature image pickup lens as defined in claim 27, wherein the fifth lens is a positive lens.

* * * * *